United States Patent
Kolekar et al.

(10) Patent No.: US 12,284,518 B2
(45) Date of Patent: Apr. 22, 2025

(54) UE ONBOARDING AND PROVISIONING USING ONE WAY AUTHENTICATION

(71) Applicant: Intel Corporation, Santa Clara, CA (US)

(72) Inventors: Abhijeet Ashok Kolekar, Hillsboro, OR (US); Alexandre Saso Stojanovski, Paris (FR); Meghashree Dattatri Kedalagudde, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 378 days.

(21) Appl. No.: 17/570,631

(22) Filed: Jan. 7, 2022

(65) Prior Publication Data

US 2022/0330022 A1    Oct. 13, 2022

Related U.S. Application Data

(60) Provisional application No. 63/135,436, filed on Jan. 8, 2021.

(51) Int. Cl.
| | |
|---|---|
| *H04W 12/069* | (2021.01) |
| *H04W 4/50* | (2018.01) |
| *H04W 12/71* | (2021.01) |
| *H04W 60/00* | (2009.01) |

(52) U.S. Cl.
CPC ........... *H04W 12/069* (2021.01); *H04W 4/50* (2018.02); *H04W 12/71* (2021.01); *H04W 60/00* (2013.01)

(58) Field of Classification Search
CPC .............................................. H04W 4/50–60
See application file for complete search history.

(56) References Cited

U.S. PATENT DOCUMENTS

| | | | | |
|---|---|---|---|---|
| 2011/0252230 | A1* | 10/2011 | Segre .................... | H04L 63/162 713/171 |
| 2013/0262850 | A1* | 10/2013 | Canpolat ............... | H04W 48/02 709/229 |
| 2014/0051391 | A1* | 2/2014 | Torres ................. | H04W 12/068 455/411 |
| 2020/0351653 | A1* | 11/2020 | Khan .................... | H04W 12/35 |
| 2020/0389865 | A1* | 12/2020 | Kunz .................... | H04W 60/04 |
| 2021/0058784 | A1* | 2/2021 | Kedalagudde ........ | H04W 48/18 |
| 2021/0211975 | A1* | 7/2021 | Prabhakar ............. | H04W 48/18 |
| 2021/0368434 | A1* | 11/2021 | Kweon ................. | H04W 48/18 |
| 2022/0159460 | A1* | 5/2022 | Ben Henda ......... | H04W 12/084 |
| 2022/0201593 | A1* | 6/2022 | Baek .................... | H04W 76/10 |

* cited by examiner

*Primary Examiner* — San Htun
(74) *Attorney, Agent, or Firm* — Schwegman Lundberg & Woessner, P.A.

(57) ABSTRACT

An apparatus and system for onboarding based on UE default manufacturer credentials are described. A UE sends default manufacturer credentials and an indication to proceed with restricted onboarding to an onboarding non-public network (O-SNPN). An Onboarding Server validates the authenticity of the UE based on the manufacturer credentials and sends a certificate. The UE is provisioned with a set of roots of trust certificate information to use to authenticate the certificate using one way authentication. After authentication, the UE receives network credentials and performs mutual authentication to register with a NPN while being authenticated by a home network. The UE identity is indicated as anonymous in response to an indication by the O-SNPN for subscriber identifier privacy.

17 Claims, 29 Drawing Sheets

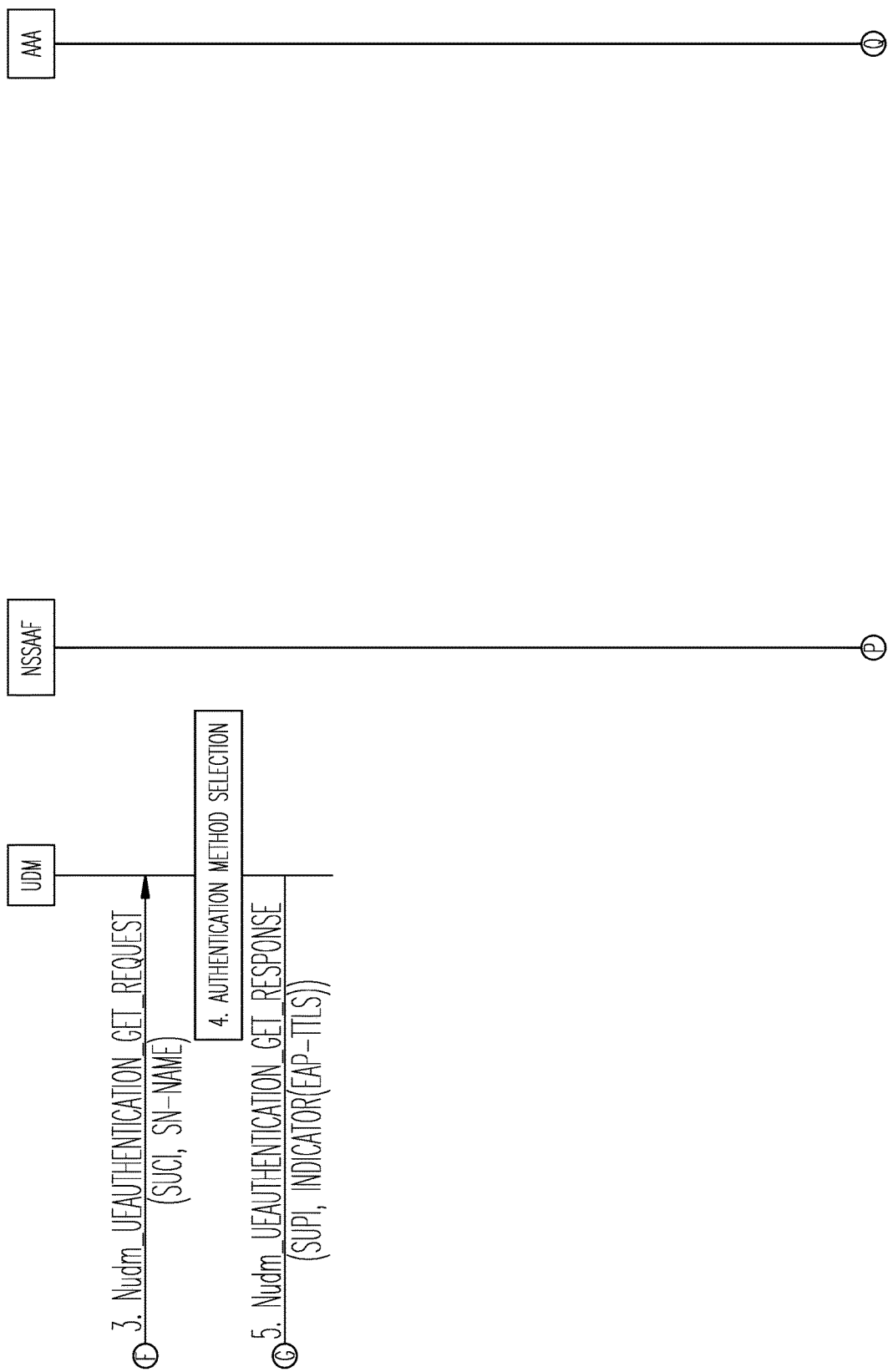

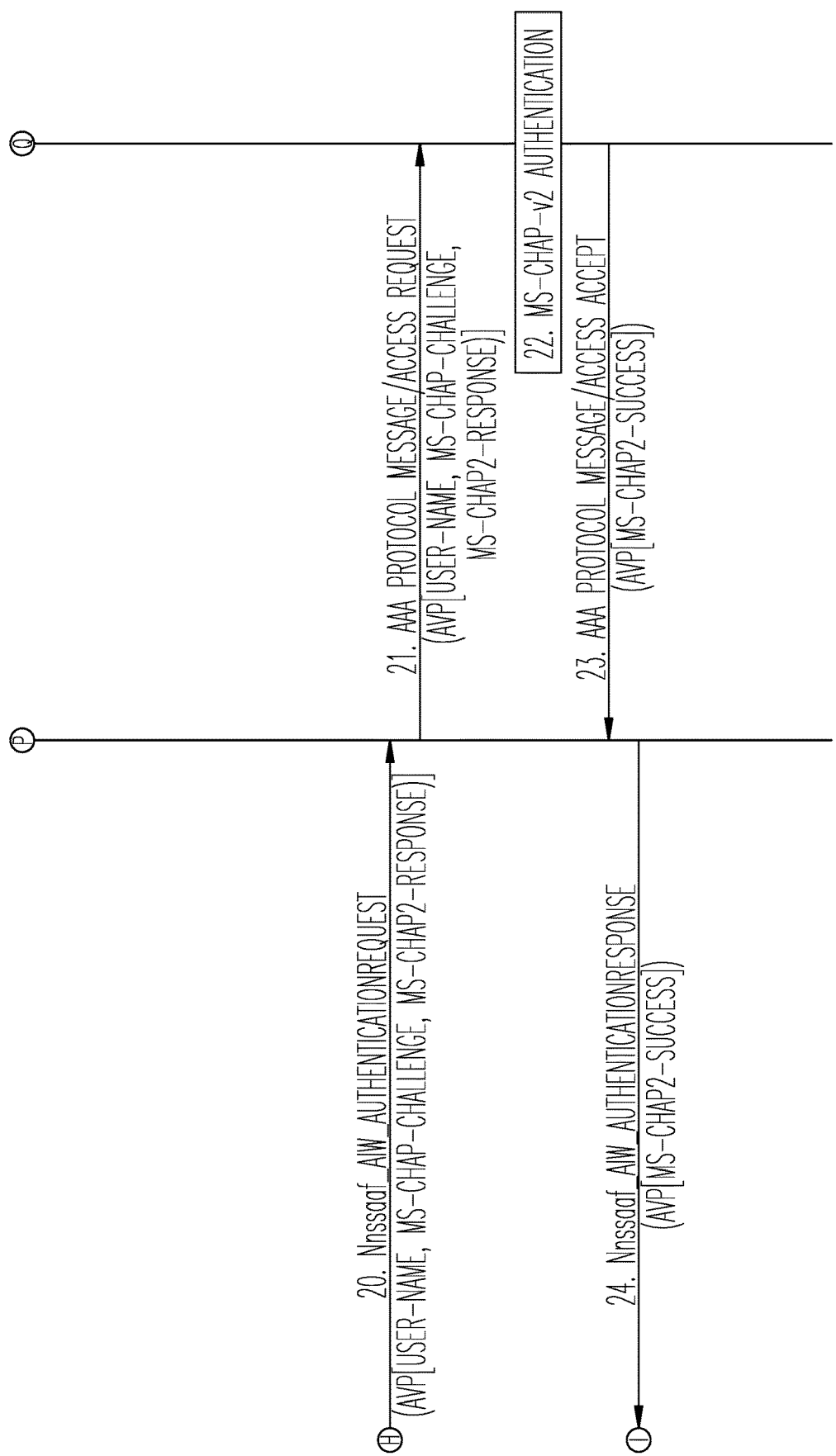

UE ONBOARDING AND PROVISIONING USING ONE WAY AUTHENTICATION

PRIORITY CLAIM

This application claims the benefit of priority under 35 U.S.C. 119(e) to U.S. Provisional Patent Application Ser. No. 63/135,436, filed Jan. 8, 2021, which is incorporated herein by reference in its entirety.

TECHNICAL FIELD

Embodiments pertain to next generation wireless communications. Some embodiments relate to user equipment (UE) onboarding and provisioning. In particular, some embodiments relate to UE onboarding and provisioning for a Stand-alone Non-Public Network (SNPN) from an Onboarding SNPN using one way authentication.

BACKGROUND

The use and complexity of wireless systems, which include $5^{th}$ generation (5G) networks and are starting to include sixth generation (6G) networks among others, has increased due to both an increase in the types of devices UEs using network resources as well as the amount of data and bandwidth being used by various applications, such as video streaming, operating on these UEs. With the vast increase in number and diversity of communication devices, the corresponding network environment, including routers, switches, bridges, gateways, firewalls, and load balancers, has become increasingly complicated. As expected, a number of issues abound with the advent of any new technology.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various embodiments discussed in the present document.

FIGS. 15A-15E illustrates primary authentication in accordance with some aspects.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1A:
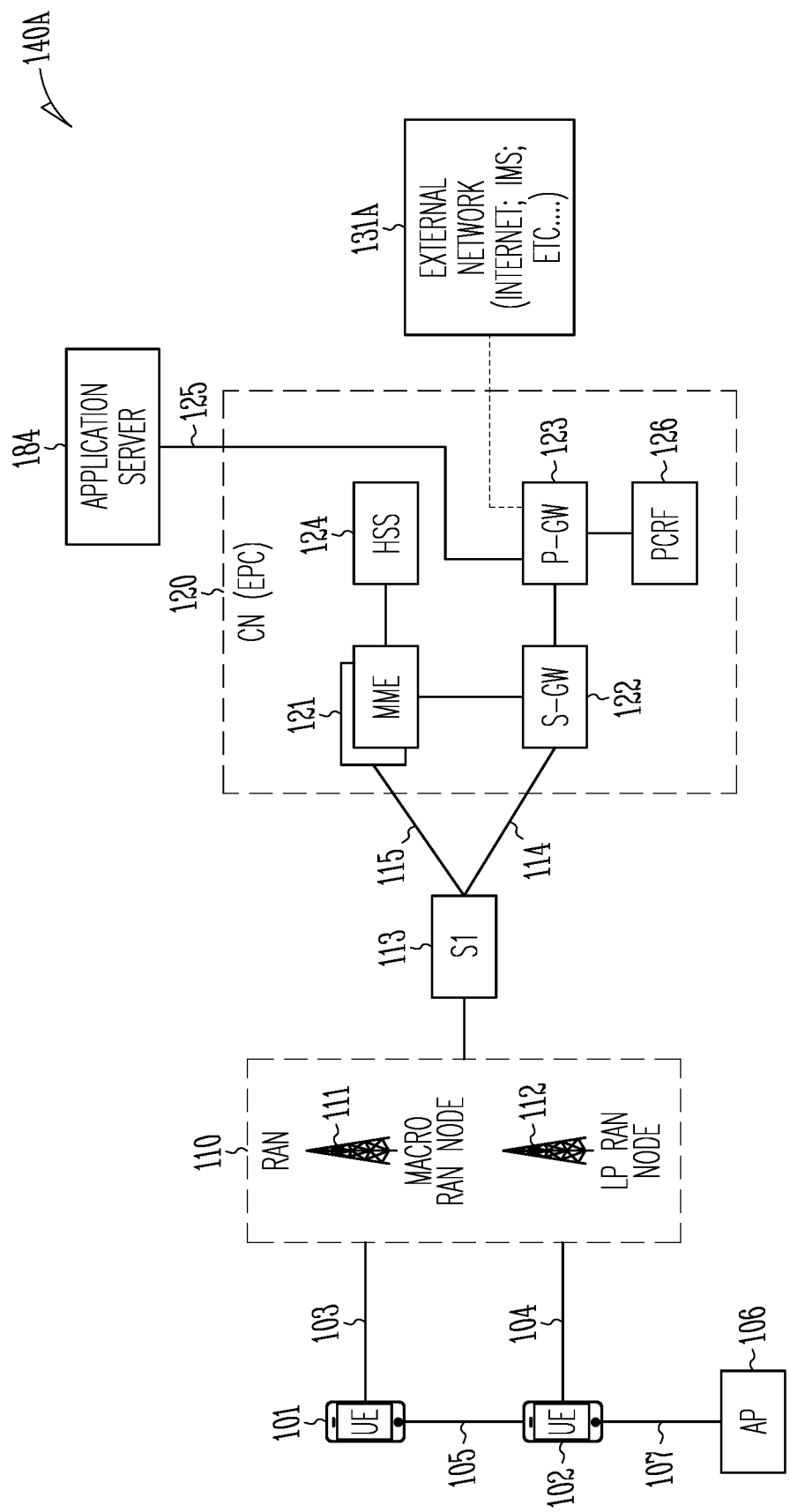
FIG. 1A illustrates an architecture of a network, in accordance with some aspects.

FIG. 1A illustrates an architecture of a network in accordance with some aspects. The network 140A includes 3GPP LTE/4G and NG network functions that may be extended to 6G functions. Accordingly, although 5G will be referred to, it is to be understood that this is to extend as able to 6G structures, systems, and functions. A network function can be implemented as a discrete network element on a dedicated hardware, as a software instance running on dedicated hardware, and/or as a virtualized function instantiated on an appropriate platform, e.g., dedicated hardware or a cloud infrastructure.

The network 140A is shown to include user equipment (UE) 101 and UE 102. The UEs 101 and 102 are illustrated as smartphones (e.g., handheld touchscreen mobile computing devices connectable to one or more cellular networks) but may also include any mobile or non-mobile computing device, such as portable (laptop) or desktop computers, wireless handsets, drones, or any other computing device including a wired and/or wireless communications interface. The UEs 101 and 102 can be collectively referred to herein as UE 101, and UE 101 can be used to perform one or more of the techniques disclosed herein.

Any of the radio links described herein (e.g., as used in the network 140A or any other illustrated network) may operate according to any exemplary radio communication technology and/or standard. Any spectrum management scheme including, for example, dedicated licensed spectrum, unlicensed spectrum, (licensed) shared spectrum (such as Licensed Shared Access (LSA) in 2.3-2.4 GHz, 3.4-3.6 GHz, 3.6-3.8 GHz, and other frequencies and Spectrum Access System (SAS) in 3.55-3.7 GHz and other frequencies). Different Single Carrier or Orthogonal Frequency Domain Multiplexing (OFDM) modes (CP-OFDM, SC-FDMA, SC-OFDM, filter bank-based multicarrier (FBMC), OFDMA, etc.), and in particular 3GPP NR, may be used by allocating the OFDM carrier data bit vectors to the corresponding symbol resources.

In some aspects, any of the UEs 101 and 102 can comprise an Internet-of-Things (IoT) UE or a Cellular IoT (CIoT) UE, which can comprise a network access layer designed for low-power IoT applications utilizing short-lived UE connections. In some aspects, any of the UEs 101 and 102 can include a narrowband (NB) IoT UE (e.g., such as an enhanced NB-IoT (eNB-IoT) UE and Further Enhanced (FeNB-IoT) UE). An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network includes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network. In some aspects, any of the UEs 101 and 102 can include enhanced MTC (eMTC) UEs or further enhanced MTC (FeMTC) UEs.

The UEs 101 and 102 may be configured to connect, e.g., communicatively couple, with a radio access network (RAN) 110. The RAN 110 may be, for example, an Evolved Universal Mobile Telecommunications System (UMTS) Terrestrial Radio Access Network (E-UTRAN), a NextGen RAN (NG RAN), or some other type of RAN.

The UEs 101 and 102 utilize connections 103 and 104, respectively, each of which comprises a physical communications interface or layer (discussed in further detail below); in this example, the connections 103 and 104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a 5G protocol, a 6G protocol, and the like.

In an aspect, the UEs 101 and 102 may further directly exchange communication data via a ProSe interface 105. The ProSe interface 105 may alternatively be referred to as a sidelink (SL) interface comprising one or more logical channels, including but not limited to a Physical Sidelink Control Channel (PSCCH), a Physical Sidelink Shared Channel (PSSCH), a Physical Sidelink Discovery Channel (PSDCH), a Physical Sidelink Broadcast Channel (PSBCH), and a Physical Sidelink Feedback Channel (PSFCH).

The UE 102 is shown to be configured to access an access point (AP) 106 via connection 107. The connection 107 can comprise a local wireless connection, such as, for example, a connection consistent with any IEEE 802.11 protocol, according to which the AP 106 can comprise a wireless fidelity (WiFi®) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, evolved NodeBs (eNBs), Next Generation NodeBs (gNBs), RAN nodes, and the like, and can comprise ground stations (e.g., terrestrial access points) or satellite stations providing coverage within a geographic area (e.g., a cell). In some aspects, the communication nodes 111 and 112 can be transmission/reception points (TRPs). In instances when the communication nodes 111 and 112 are NodeBs (e.g., eNBs or gNBs), one or more TRPs can function within the communication cell of the NodeBs. The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some aspects, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management. In an example, any of the nodes 111 and/or 112 can be a gNB, an eNB, or another type of RAN node.

The RAN 110 is shown to be communicatively coupled to a core network (CN) 120 via an S1 interface 113. In aspects, the CN 120 may be an evolved packet core (EPC) network, a NextGen Packet Core (NPC) network, or some other type of CN (e.g., as illustrated in reference to FIGS. 1B-1C). In this aspect, the S1 interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMEs 121.

In this aspect, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities of the S-GW 122 may include a lawful intercept, charging, and some policy enforcement.

The P-GW 123 may terminate an SGi interface toward a PDN. The P-GW 123 may route data packets between the CN 120 and external networks such as a network including the application server 184 (alternatively referred to as application function (AF)) via an Internet Protocol (IP) interface 125. The P-GW 123 can also communicate data to other external networks 131A, which can include the Internet, IP multimedia subsystem (IPS) network, and other networks. Generally, the application server 184 may be an element offering applications that use IP bearer resources with the core network (e.g., UMTS Packet Services (PS) domain, LTE PS data services, etc.). In this aspect, the P-GW 123 is shown to be communicatively coupled to an application server 184 via an IP interface 125. The application server 184 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 may further be a node for policy enforcement and charging data collection. Policy and Charging Rules Function (PCRF) 126 is the policy and charging control element of the CN 120. In a non-roaming scenario, in some aspects, there may be a single PCRF in the Home Public Land Mobile Network (HPLMN) associated with a UE's Internet Protocol Connectivity Access Network (IP-CAN) session. In a roaming scenario with a local breakout of traffic, there may be two PCRFs associated with a UE's IP-CAN session: a Home PCRF (H-PCRF) within an HPLMN and a Visited PCRF (V-PCRF) within a Visited Public Land Mobile Network (VPLMN). The PCRF 126 may be communicatively coupled to the application server 184 via the P-GW 123.

In some aspects, the communication network 140A can be an IoT network or a 5G or 6G network, including 5G new radio network using communications in the licensed (5G NR) and the unlicensed (5G NR-U) spectrum. One of the current enablers of IoT is the narrowband-IoT (NB-IoT). Operation in the unlicensed spectrum may include dual connectivity (DC) operation and the standalone LTE system in the unlicensed spectrum, according to which LTE-based technology solely operates in unlicensed spectrum without the use of an "anchor" in the licensed spectrum, called MulteFire. Further enhanced operation of LTE systems in the licensed as well as unlicensed spectrum is expected in future releases and 5G systems. Such enhanced operations can include techniques for sidelink resource allocation and UE processing behaviors for NR sidelink V2X communications.

An NG system architecture (or 6G system architecture) can include the RAN 110 and a 5G core network (5GC) 120. The NG-RAN 110 can include a plurality of nodes, such as gNBs and NG-eNBs. The CN 120 (e.g., a 5G core network/5GC) can include an access and mobility function (AMF) and/or a user plane function (UPF). The AMF and the UPF can be communicatively coupled to the gNBs and the NG-eNBs via NG interfaces. More specifically, in some aspects, the gNBs and the NG-eNBs can be connected to the AMF by NG-C interfaces, and to the UPF by NG-U interfaces. The gNBs and the NG-eNBs can be coupled to each other via Xn interfaces.

In some aspects, the NG system architecture can use reference points between various nodes. In some aspects, each of the gNBs and the NG-eNBs can be implemented as a base station, a mobile edge server, a small cell, a home eNB, and so forth. In some aspects, a gNB can be a master node (MN) and NG-eNB can be a secondary node (SN) in a 5G architecture.

Figure 1B:
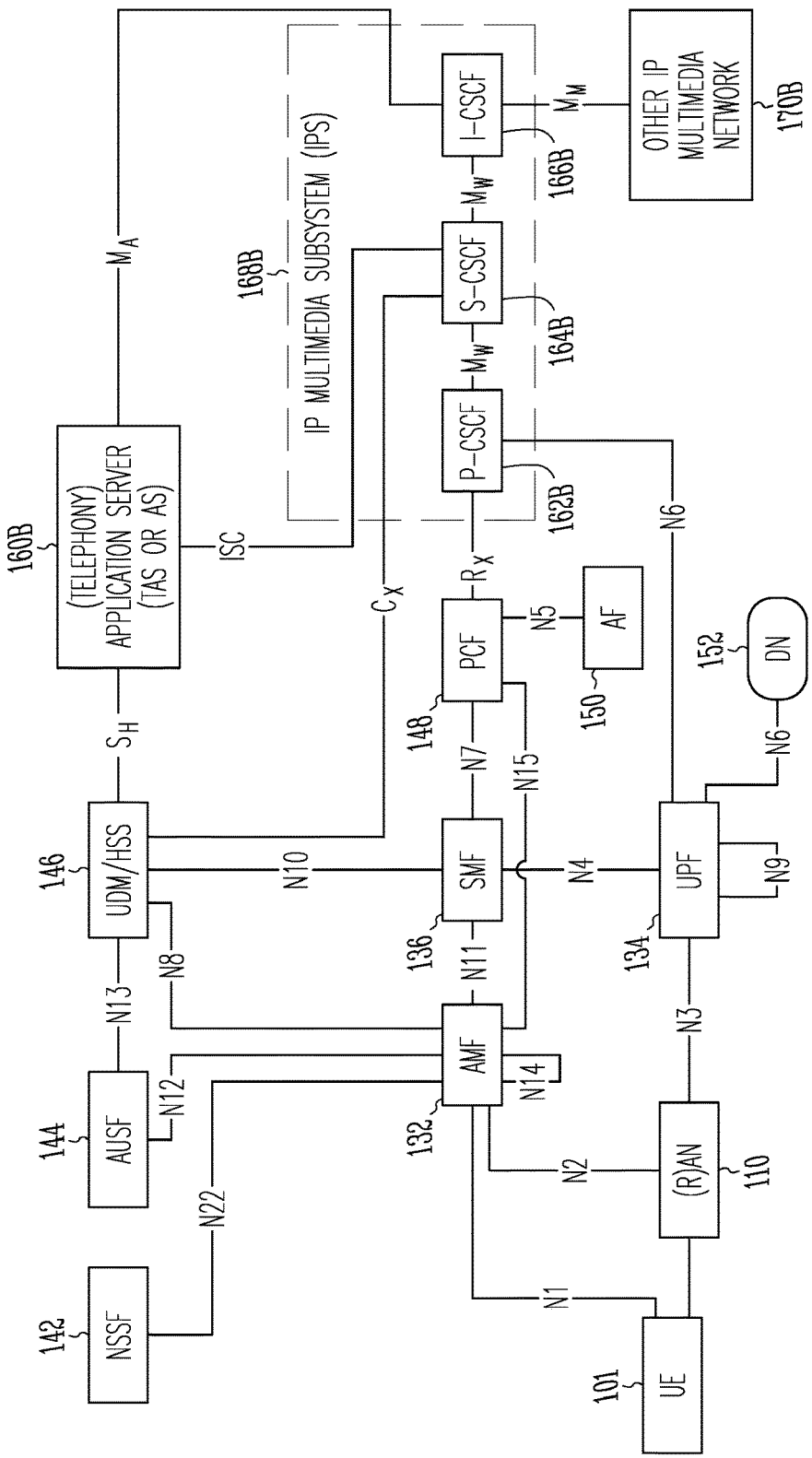
FIG. 1B illustrates a non-roaming 5G system architecture in accordance with some aspects.

FIG. 1B illustrates a non-roaming 5G system architecture in accordance with some aspects. In particular, FIG. 1B illustrates a 5G system architecture 140B in a reference point representation, which may be extended to a 6G system architecture. More specifically, UE 102 can be in communication with RAN 110 as well as one or more other 5GC network entities. The 5G system architecture 140B includes a plurality of network functions (NFs), such as an AMF 132, session management function (SMF) 136, policy control function (PCF) 148, application function (AF) 150, UPF 134, network slice selection function (NSSF) 142, authentication server function (AUSF) 144, and unified data management (UDM)/home subscriber server (HSS) 146.

The UPF 134 can provide a connection to a data network (DN) 152, which can include, for example, operator services, Internet access, or third-party services. The AMF 132 can be used to manage access control and mobility and can also include network slice selection functionality. The AMF 132 may provide UE-based authentication, authorization, mobility management, etc., and may be independent of the access technologies. The SMF 136 can be configured to set up and manage various sessions according to network policy. The SMF 136 may thus be responsible for session management and allocation of IP addresses to UEs. The SMF 136 may also select and control the UPF 134 for data transfer. The SMF 136 may be associated with a single session of a UE 101 or multiple sessions of the UE 101. This is to say that the UE 101 may have multiple 5G sessions. Different SMFs may be allocated to each session. The use of different SMFs may permit each session to be individually managed. As a consequence, the functionalities of each session may be independent of each other.

The UPF 134 can be deployed in one or more configurations according to the desired service type and may be connected with a data network. The PCF 148 can be configured to provide a policy framework using network slicing, mobility management, and roaming (similar to PCRF in a 4G communication system). The UDM can be configured to store subscriber profiles and data (similar to an HSS in a 4G communication system).

The AF 150 may provide information on the packet flow to the PCF 148 responsible for policy control to support a desired QoS. The PCF 148 may set mobility and session management policies for the UE 101. To this end, the PCF 148 may use the packet flow information to determine the appropriate policies for proper operation of the AMF 132 and SMF 136. The AUSF 144 may store data for UE authentication.

In some aspects, the 5G system architecture 140B includes an IP multimedia subsystem (IMS) 168B as well as a plurality of IP multimedia core network subsystem entities, such as call session control functions (CSCFs). More specifically, the IMS 168B includes a CSCF, which can act as a proxy CSCF (P-CSCF) 162BE, a serving CSCF (S-CSCF) 164B, an emergency CSCF (E-CSCF) (not illustrated in FIG. 1B), or interrogating CSCF (I-CSCF) 166B. The P-CSCF 162B can be configured to be the first contact point for the UE 102 within the IM subsystem (IMS) 168B. The S-CSCF 164B can be configured to handle the session states in the network, and the E-CSCF can be configured to handle certain aspects of emergency sessions such as routing an emergency request to the correct emergency center or PSAP. The I-CSCF 166B can be configured to function as the contact point within an operator's network for all IMS connections destined to a subscriber of that network operator, or a roaming subscriber currently located within that network operator's service area. In some aspects, the I-CSCF 166B can be connected to another IP multimedia network 170E, e.g. an IMS operated by a different network operator.

In some aspects, the UDM/HSS 146 can be coupled to an application server 160E, which can include a telephony application server (TAS) or another application server (AS). The AS 160B can be coupled to the IMS 168B via the S-CSCF 164B or the I-CSCF 166B.

A reference point representation shows that interaction can exist between corresponding NF services. For example, FIG. 1B illustrates the following reference points: N1 (between the UE 102 and the AMF 132), N2 (between the RAN 110 and the AMF 132), N3 (between the RAN 110 and the UPF 134), N4 (between the SMF 136 and the UPF 134), N5 (between the PCF 148 and the AF 150, not shown), N6 (between the UPF 134 and the DN 152), N7 (between the SMF 136 and the PCF 148, not shown), N8 (between the UDM 146 and the AMF 132, not shown), N9 (between two UPFs 134, not shown), N10 (between the UDM 146 and the SMF 136, not shown), N11 (between the AMF 132 and the SMF 136, not shown), N12 (between the AUSF 144 and the AMF 132, not shown), N13 (between the AUSF 144 and the UDM 146, not shown), N14 (between two AMFs 132, not shown), N15 (between the PCF 148 and the AMF 132 in case of a non-roaming scenario, or between the PCF 148 and a visited network and AMF 132 in case of a roaming scenario, not shown), N16 (between two SMFs, not shown), and N22 (between AMF 132 and NSSF 142, not shown). Other reference point representations not shown in FIG. 1B can also be used.

Figure 1C:
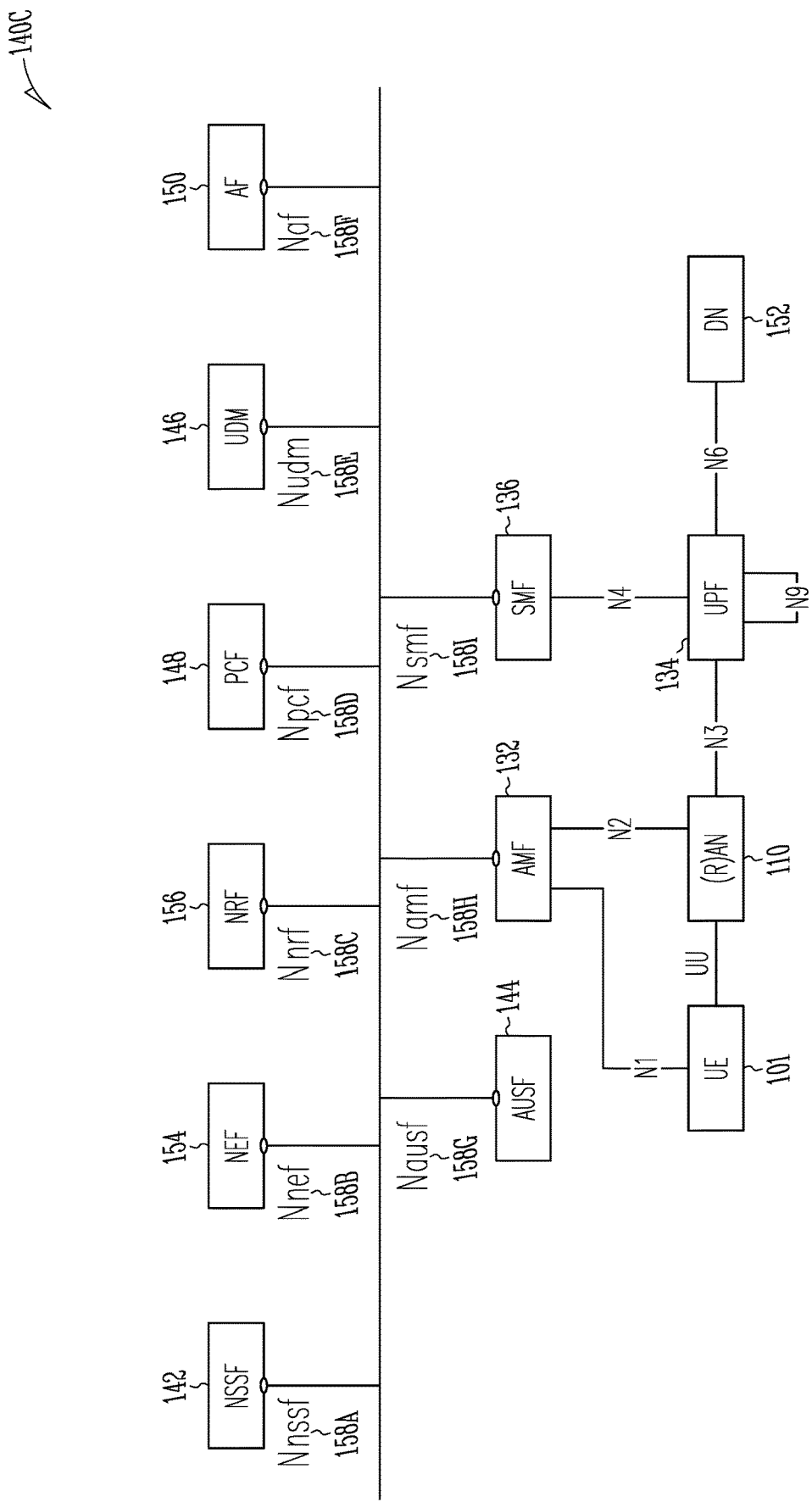
FIG. 1C illustrates a non-roaming 5G system architecture in accordance with some aspects.

FIG. 1C illustrates a 5G system architecture 140C and a service-based representation. In addition to the network entities illustrated in FIG. 1B, system architecture 140C can also include a network exposure function (NEF) 154 and a network repository function (NRF) 156. In some aspects, 5G system architectures can be service-based and interaction between network functions can be represented by corresponding point-to-point reference points Ni or as service-based interfaces.

In some aspects, as illustrated in FIG. 1C, service-based representations can be used to represent network functions within the control plane that enable other authorized network functions to access their services. In this regard, 5G system architecture 140C can include the following service-based interfaces: Namf 158H (a service-based interface exhibited by the AMF 132), Nsmf 158I (a service-based interface exhibited by the SMF 136), Nnef 158B (a service-based interface exhibited by the NEF 154), Npcf 158D (a service-based interface exhibited by the PCF 148), a Nudm 158E (a service-based interface exhibited by the UDM 146), Naf 158F (a service-based interface exhibited by the AF 150), Nnrf 158C (a service-based interface exhibited by the NRF 156), Nnssf 158A (a service-based interface exhibited by the NSSF 142), Nausf 158G (a service-based interface exhibited by the AUSF 144). Other service-based interfaces (e.g., Nudr, N5g-eir, and Nudsf) not shown in FIG. 1C can also be used.

NR-V2X architectures may support high-reliability low latency sidelink communications with a variety of traffic patterns, including periodic and aperiodic communications with random packet arrival time and size. Techniques disclosed herein can be used for supporting high reliability in distributed communication systems with dynamic topologies, including sidelink NR V2X communication systems.

Figure 2:
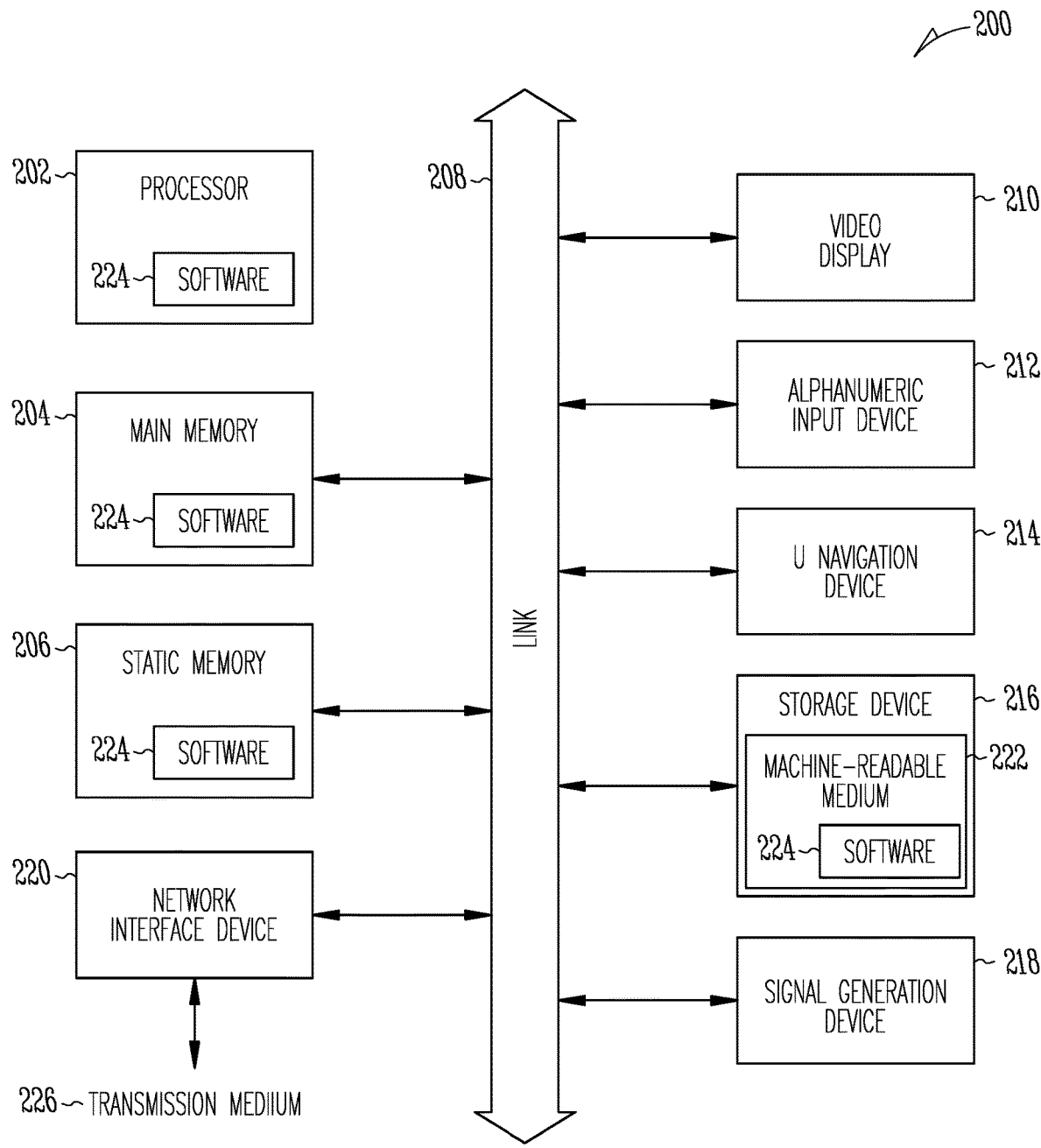
FIG. 2 illustrates a block diagram of a communication device in accordance with some embodiments.

FIG. 2 illustrates a block diagram of a communication device in accordance with some embodiments. The communication device 200 may be a UE such as a specialized computer, a personal or laptop computer (PC), a tablet PC, or a smart phone, dedicated network equipment such as an eNB, a server running software to configure the server to operate as a network device, a virtual device, or any machine capable of executing instructions (sequential or otherwise) that specify actions to be taken by that machine. For example, the communication device 200 may be implemented as one or more of the devices shown in FIGS. 1A-1C. Note that communications described herein may be encoded before transmission by the transmitting entity (e.g., UE, gNB) for reception by the receiving entity (e.g., gNB, UE) and decoded after reception by the receiving entity.

Examples, as described herein, may include, or may operate on, logic or a number of components, modules, or mechanisms. Modules and components are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" (and "component") is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The communication device 200 may include a hardware processor (or equivalently processing circuitry) 202 (e.g., a central processing unit (CPU), a GPU, a hardware processor core, or any combination thereof), a main memory 204 and a static memory 206, some or all of which may communicate with each other via an interlink (e.g., bus) 208. The main memory 204 may contain any or all of removable storage and non-removable storage, volatile memory or non-volatile memory. The communication device 200 may further include a display unit 210 such as a video display, an alphanumeric input device 212 (e.g., a keyboard), and a user interface (UI) navigation device 214 (e.g., a mouse). In an example, the display unit 210, input device 212 and UI navigation device 214 may be a touch screen display. The communication device 200 may additionally include a storage device (e.g., drive unit) 216, a signal generation device 218 (e.g., a speaker), a network interface device 220, and one or more sensors, such as a global positioning system (GPS) sensor, compass, accelerometer, or other sensor. The communication device 200 may further include an output controller, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 216 may include a non-transitory machine readable medium 222 (hereinafter simply referred to as machine readable medium) on which is stored one or more sets of data structures or instructions 224 (e.g., software) embodying or utilized by any one or more of the techniques or functions described herein. The instructions 224 may also reside, completely or at least partially, within the main memory 204, within static memory 206, and/or within the hardware processor 202 during execution thereof by the communication device 200. While the machine readable medium 222 is illustrated as a single medium, the term "machine readable medium" may include a single medium or multiple media (e.g., a centralized or distributed database, and/or associated caches and servers) configured to store the one or more instructions 224.

The term "machine readable medium" may include any medium that is capable of storing, encoding, or carrying instructions for execution by the communication device 200 and that cause the communication device 200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks.

The instructions 224 may further be transmitted or received over a communications network using a transmission medium 226 via the network interface device 220 utilizing any one of a number of wireless local area network (WLAN) transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks. Communications over the networks may include one or more different protocols, such as Institute of Electrical and Electronics Engineers (IEEE) 802.11 family of standards known as Wi-Fi, IEEE 802.16 family of standards known as WiMax, IEEE 802.15.4 family of standards, a Long Term Evolution (LTE) family of standards, a Universal Mobile Telecommunications System (UMTS) family of standards, peer-to-peer (P2P) networks, a next generation (NG)/5$^{th}$ generation (5G) standards among others. In an example, the network interface device 220 may include one or more physical jacks (e.g., Ethernet, coaxial, or phone jacks) or one or more antennas to connect to the transmission medium 226.

Note that the term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" or "processor" as used herein thus refers to, is part of, or includes circuitry capable of sequentially and automatically carrying out a sequence of arithmetic or logical operations, or recording, storing, and/or transferring digital data. The term "processor circuitry" or "processor" may refer to one or more application processors, one or more baseband processors, a physical central processing unit (CPU), a single- or multi-core processor, and/or any other device capable of executing or otherwise operating computer-executable instructions, such as program code, software modules, and/or functional processes.

Any of the radio links described herein may operate according to any one or more of the following radio communication technologies and/or standards including but not limited to: a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology, for example Universal Mobile Telecommunications System (UMTS), Freedom of Multimedia Access (FOMA), 3GPP Long Term Evolution (LTE), 3GPP Long Term Evolution Advanced (LTE Advanced), Code division multiple access 2000 (CDMA2000), Cellular Digital Packet Data (CDPD), Mobitex, Third Generation (3G), Circuit Switched Data (CSD), High-Speed Circuit-Switched Data (HSCSD), Universal Mobile Telecommunications System (Third Generation) (UMTS (3G)), Wideband Code Division Multiple Access (Universal Mobile Telecommunications System) (W-CDMA (UMTS)), High Speed Packet Access (HSPA), High-Speed Downlink Packet Access (HSDPA), High-Speed Uplink Packet Access (HSUPA), High Speed Packet Access Plus (HSPA+), Universal Mobile Telecommunications System-Time-Division Duplex (UMTS-TDD), Time Division-Code Division Multiple Access (TD-CDMA), Time Division-Synchronous Code Division Multiple Access (TD-CDMA), 3rd Generation Partnership Project Release 8 (Pre-4th Generation) (3GPP Rel. 8 (Pre-4G)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP 15 (3rd Generation Partnership Project Release 15), 3GPP Rel. 16 (3rd Generation Partnership Project Release 16), 3GPP Rel. 17 (3rd Generation Partnership Project Release 17) and subsequent Releases (such as Rel. 18, Rel. 19, etc.), 3GPP 5G, 5G, 5G New Radio (5G NR), 3GPP 5G New Radio, 3GPP LTE Extra, LTE-Advanced Pro, LTE Licensed-Assisted Access (LAA), MuLTEfire, UMTS Terrestrial Radio Access (UTRA), Evolved UMTS Terrestrial Radio Access (E-UTRA), Long Term Evolution Advanced (4th Generation) (LTE Advanced (4G)), cdmaOne (2G), Code division multiple access 2000 (Third generation) (CDMA2000 (3G)), Evolution-Data Optimized or Evolution-Data Only (EV-DO), Advanced Mobile Phone System (1st Generation) (AMPS (1G)), Total Access Communication System/Extended Total Access Communication System (TACS/ETACS), Digital AMPS (2nd Generation) (D-AMPS (2G)), Push-to-talk (PTT), Mobile Telephone System (MTS), Improved Mobile Telephone System (IMTS), Advanced Mobile Telephone System (AMTS), OLT (Norwegian for Offentlig Landmobil Telefoni, Public Land Mobile Telephony), MTD (Swedish abbreviation for Mobiltelefonisystem D, or Mobile telephony system D), Public Automated Land Mobile (Autotel/PALM), ARP (Finnish for Autoradiopuhelin, "car radio phone"), NMT (Nordic Mobile Telephony), High capacity version of NTT (Nippon Telegraph and Telephone) (Hicap), Cellular Digital Packet Data (CDPD), Mobitex, DataTAC, Integrated Digital Enhanced Network (iDEN), Personal Digital Cellular (PDC), Circuit Switched Data (CSD), Personal Handy-phone System (PHS), Wideband Integrated Digital Enhanced Network (WiDEN), iBurst, Unlicensed Mobile Access (UMA), also referred to as also referred to as 3GPP Generic Access Network, or GAN standard), Zigbee, Bluetooth®, Wireless Gigabit Alliance (WiGig) standard, mmWave standards in general (wireless systems operating at 10-300 GHz and above such as WiGig, IEEE 802.11ad, IEEE 802.11ay, etc.), technologies operating above 300 GHz and THz bands, (3GPP/LTE based or IEEE 802.11p or IEEE 802.11bd and other) Vehicle-to-Vehicle (V2V) and Vehicle-to-X (V2X) and Vehicle-to-Infrastructure (V2I) and Infrastructure-to-Vehicle (I2V) communication technologies, 3GPP cellular V2X, DSRC (Dedicated Short Range Communications) communication systems such as Intelligent-Transport-Systems and others (typically operating in 5850 MHz to 5925 MHz or above (typically up to 5935 MHz following change proposals in CEPT Report 71)), the European ITS-G5 system (i.e. the European flavor of IEEE 802.11p based DSRC, including ITS-G5A (i.e., Operation of ITS-G5 in European ITS frequency bands dedicated to ITS for safety re-lated applications in the frequency range 5,875 GHz to 5,905 GHz), ITS-G5B (i.e., Operation in European ITS frequency bands dedicated to ITS non-safety applications in the frequency range 5,855 GHz to 5,875 GHz), ITS-G5C (i.e., Operation of ITS applications in the frequency range 5,470 GHz to 5,725 GHz)), DSRC in Japan in the 700 MHz band (including 715 MHz to 725 MHz), IEEE 802.11bd based systems, etc.

Aspects described herein can be used in the context of any spectrum management scheme including dedicated licensed spectrum, unlicensed spectrum, license exempt spectrum, (licensed) shared spectrum (such as LSA=Licensed Shared Access in 2.3-2.4 GHz, 3.4-3.6 GHz, 3.6-3.8 GHz and further frequencies and SAS=Spectrum Access System/CBRS=Citizen Broadband Radio System in 3.55-3.7 GHz and further frequencies). Applicable spectrum bands include IMT (International Mobile Telecommunications) spectrum as well as other types of spectrum/bands, such as bands with national allocation (including 450-470 MHz, 902-928 MHz (note: allocated for example in US (FCC Part 15)), 863-868.6 MHz (note: allocated for example in European Union (ETSI EN 300 220)), 915.9-929.7 MHz (note: allocated for example in Japan), 917-923.5 MHz (note: allocated for example in South Korea), 755-779 MHz and 779-787 MHz (note: allocated for example in China), 790-960 MHz, 1710-2025 MHz, 2110-2200 MHz, 2300-2400 MHz, 2.4-2.4835 GHz (note: it is an ISM band with global availability and it is used by Wi-Fi technology family (11b/g/n/ax) and also by Bluetooth), 2500-2690 MHz, 698-790 MHz, 610-790 MHz, 3400-3600 MHz, 3400-3800 MHz, 3800-4200 MHz, 3.55-3.7 GHz (note: allocated for example in the US for Citizen Broadband Radio Service), 5.15-5.25 GHz and 5.25-5.35 GHz and 5.47-5.725 GHz and 5.725-5.85 GHz bands (note: allocated for example in the US (FCC part 15), consists four U-NII bands in total 500 MHz spectrum), 5.725-5.875 GHz (note: allocated for example in EU (ETSI EN 301 893)), 5.47-5.65 GHz (note: allocated for example in South Korea, 5925-7125 MHz and 5925-6425 MHz band (note: under consideration in US and EU, respectively. Next generation Wi-Fi system is expected to include the 6 GHz spectrum as operating band but it is noted that, as of December 2017, Wi-Fi system is not yet allowed in this band. Regulation is expected to be finished in 2019-2020 time frame), IMT-advanced spectrum, IMT-2020 spectrum (expected to include 3600-3800 MHz, 3800-4200 MHz, 3.5 GHz bands, 700 MHz bands, bands within the 24.25-86 GHz range, etc.), spectrum made available under FCC's "Spectrum Frontier" 5G initiative (including 27.5-28.35 GHz, 29.1-29.25 GHz, 31-31.3 GHz, 37-38.6 GHz, 38.6-40 GHz, 42-42.5 GHz, 57-64 GHz, 71-76 GHz, 81-86 GHz and 92-94 GHz, etc), the ITS (Intelligent Transport Systems) band of 5.9 GHz (typically 5.85-5.925 GHz) and 63-64 GHz, bands currently allocated to WiGig such as WiGig Band 1 (57.24-59.40 GHz), WiGig Band 2 (59.40-61.56 GHz) and WiGig Band 3 (61.56-63.72 GHz) and WiGig Band 4 (63.72-65.88 GHz), 57-64/66 GHz (note: this band has near-global designation for Multi-Gigabit Wireless Systems (MGWS)/WiGig. In US (FCC part 15) allocates total 14 GHz spectrum, while EU (ETSI EN 302 567 and ETSI EN 301 217-2 for fixed P2P) allocates total 9 GHz spectrum), the 70.2 GHz-71 GHz band, any band between 65.88 GHz and 71 GHz, bands currently allocated to automotive radar applications such as 76-81 GHz, and future bands including 94-300 GHz and above. Furthermore, the scheme can be used on a secondary basis on bands such as the TV White Space bands (typically below 790 MHz) where in particular the 400 MHz and 700 MHz bands are promising candidates. Besides cellular applications, specific applications for vertical markets may be addressed such as PMSE (Program Making and Special Events), medical, health, surgery, automotive, low-latency, drones, etc. applications.

Aspects described herein can also implement a hierarchical application of the scheme is possible, e.g., by introducing a hierarchical prioritization of usage for different types of users (e.g., low/medium/high priority, etc.), based on a prioritized access to the spectrum e.g., with highest priority to tier-1 users, followed by tier-2, then tier-3, etc. users, etc.

Aspects described herein can also be applied to different Single Carrier or OFDM flavors (CP-OFDM, SC-FDMA, SC-OFDM, filter bank-based multicarrier (FBMC), OFDMA, etc.) and in particular 3GPP NR (New Radio) by allocating the OFDM carrier data bit vectors to the corresponding symbol resources.

Some of the features are defined for the network side, such as APs, eNBs, NR or gNBs—note that this term is typically used in the context of 3GPP 5G and 6G communication systems, etc. Still, a UE may take this role as well and act as an AP, eNB, or gNB; that is some or all features defined for network equipment may be implemented by a UE.

As above, one of the numerous issues to consider is provisioning on-demand connectivity for non-public networks (NPNs). Such connectivity includes, for example, internet protocol (IP) connectivity for remote provisioning. This issue includes a secure mechanism for a network operator of an NPN to remotely provision non-3GPP identities and credentials of a uniquely identifiable and verifiably secure UE, such as an IoT device (e.g., in factory environment).

Figure 3:
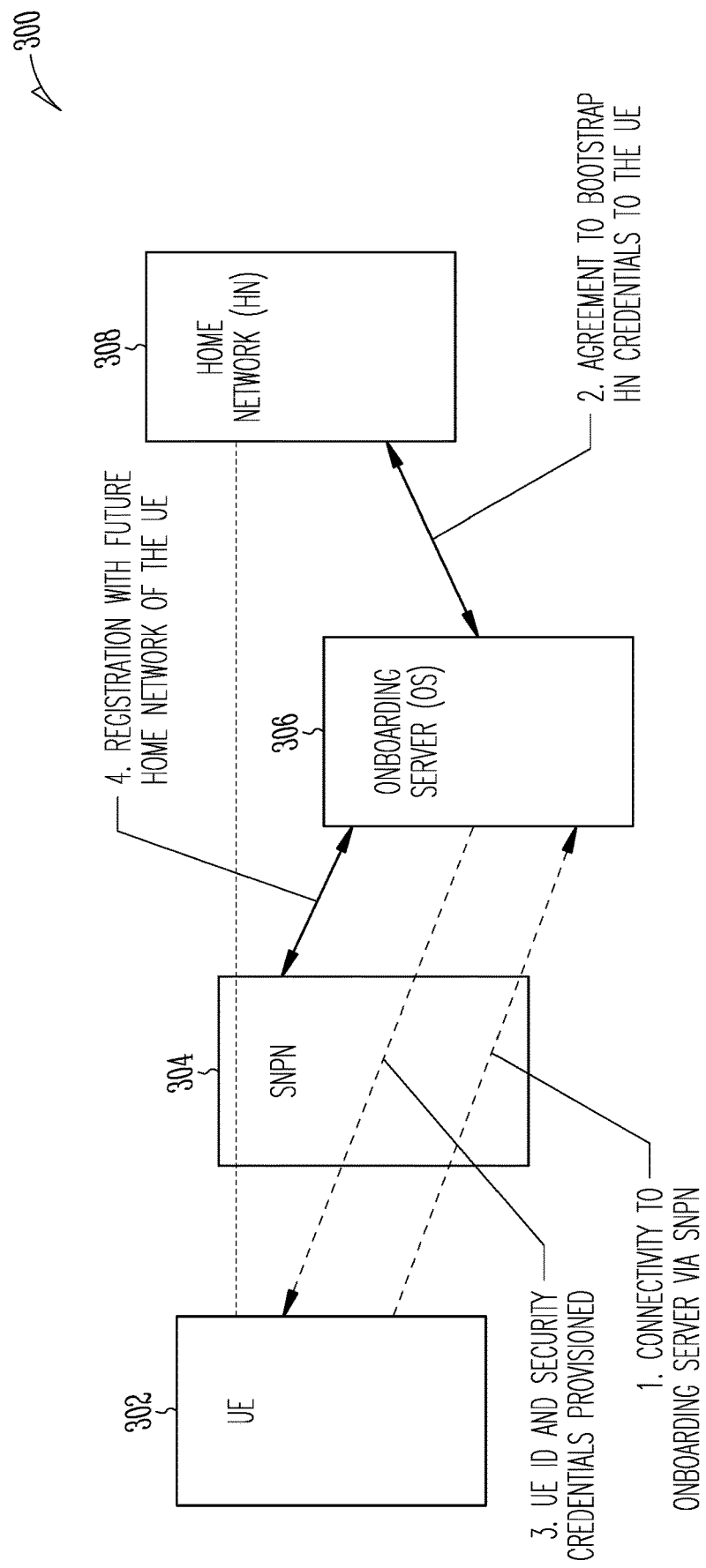
FIG. 3 illustrates an example of UE onboarding for non-public network in accordance with some aspects.

FIG. 3 illustrates an example of UE onboarding for non-public network in accordance with some aspects. To support UE onboarding for a non-public network, a number of entities are considered in the system 300. These entities include a UE 302 with only the credentials provided by the UE manufacturer, henceforth referred to as "manufacturer credentials". The UE 302 is not provisioned with credentials to access either the SNPN 304 or the future home network 308 of the UE 302 (henceforth referred to as "network credentials"). The network credentials can be either 3GPP credentials (i.e., a Subscription Permanent Identifier (SUPI) and associated key for an Authentication and Key Agreement (AKA)) or non-3GPP credentials (e.g., user identifier in Network Access Identifier (NAI) format and associated digital certificate).

The SNPN 304 supports connectivity from an unauthenticated UE (i.e., a UE with no network credentials) to an onboarding server (OS) 306 so that the UE 302 can be provisioned with network credentials of a Home Network (HN) 308. In a majority of cases, the SNPN 304 and HN 308 is the same network; in certain scenarios, however, the SNPN 304 may be different from the HN 308. In the general case depicted in FIG. 3, the SNPN 304 and HN 308 are considered as separate networks.

An Onboarding Server (OS) 306 is maintained by the device manufacturer (or an entity affiliated with the manufacturer) for provisioning the UE 302 with network credentials. The Onboarding Server 306 plays the role of a verifier, i.e., the Onboarding Server 306 validates the authenticity of the UE 302 based on the manufacturer credentials assigned to the UE 302 during the manufacturing process.

If operation 1 shown in FIG. 3 is completed successfully, the Onboarding Server 306 configures the UE 302 in cooperation with the future home network 308 of the UE 302 with credentials that allows the UE 302 to register with an NPN while being authenticated by the home network 308.

Figure 4:
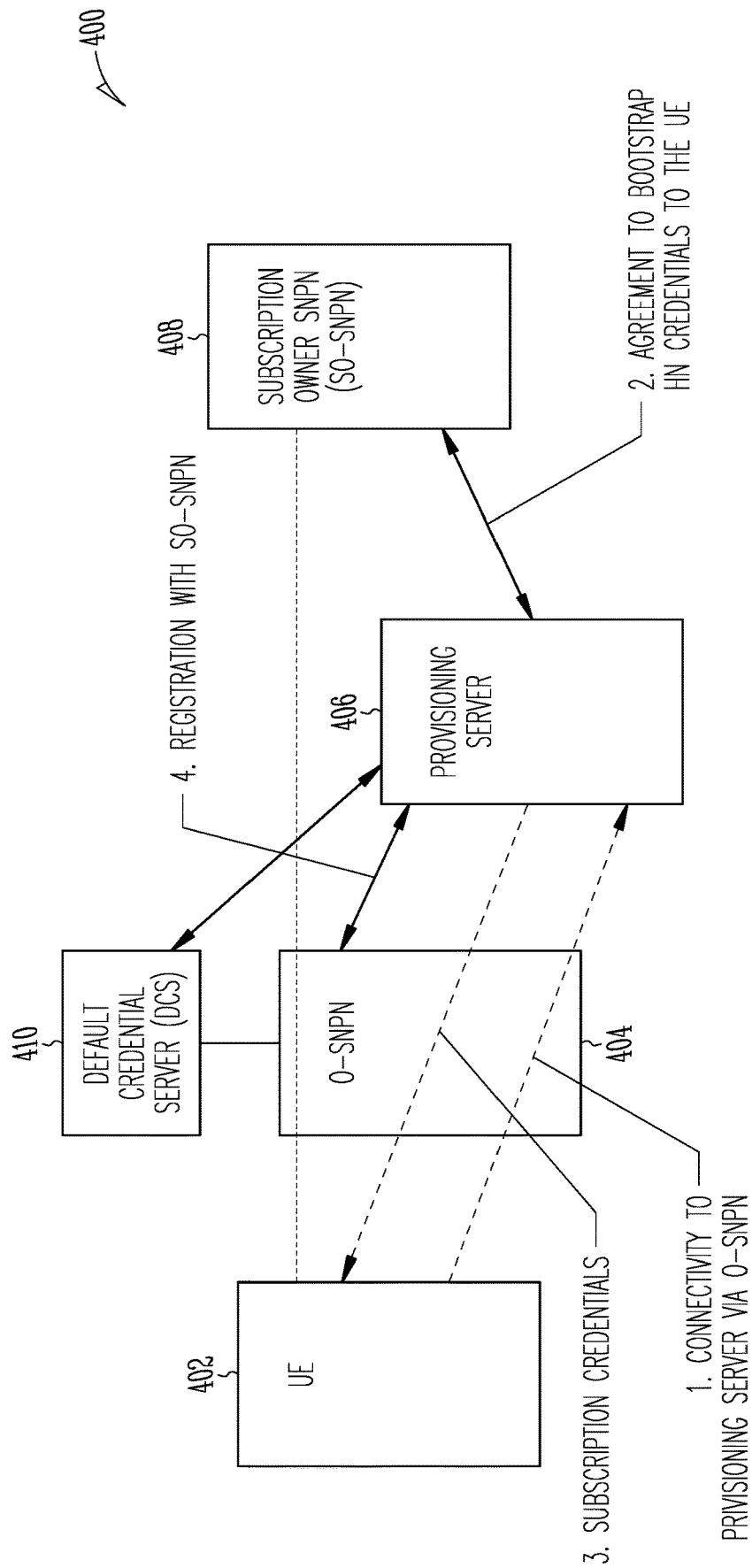
FIG. 4 illustrates another example of UE onboarding for non-public network in accordance with some aspects.

As shown, operation 4 in FIG. 3 includes securing initial access for UE onboarding between the UE and SNPN, for devices without a Universal Integrated Circuit Card (UICC). FIG. 4 illustrates another example of UE onboarding for non-public network in accordance with some aspects. FIG. 4 shows a general use-case for operation 4 in the system 400. The UE 402 authenticates the network using one way authentication as part of a primary authentication procedure and performs mutual authentication with DCS using any Extensible Authentication Protocol (EAP) method as part of secondary authentication. Each procedure may use associated AKA or EAP communications. In one way authentication, the network authenticates itself to the UE 402 but the UE 402 does not authenticate itself to the network.

When a UE 402 is deployed without a provisioned subscription, the system 400 provides a mechanism for provisioning UE subscription/credentials to the UE 402. This enables the UE 402 to get network connectivity to an onboarding SNPN (O-SNPN) 404 so that the UE 402 can be provisioned with subscription credentials and configuration for the Subscription Owner SNPN (SO-SNPN) 408 that will own the UE's subscription ("SNPN owning the subscription"). This reduces O-SNPN complexity by allowing new control plane interfaces to be avoided; the connectivity between the O-SNPN 408 and the Default Credential Server (DCS) 410 may instead rely on the existing interface for secondary authentication. Also, UE onboarding may be performed via either 3GPP access (i.e., via an O-SNPN 404) or via non-3GPP access like Wi-Fi, the connectivity between the UE 402 and the Provisioning Server 406 being established via the Internet.

Figure 5:
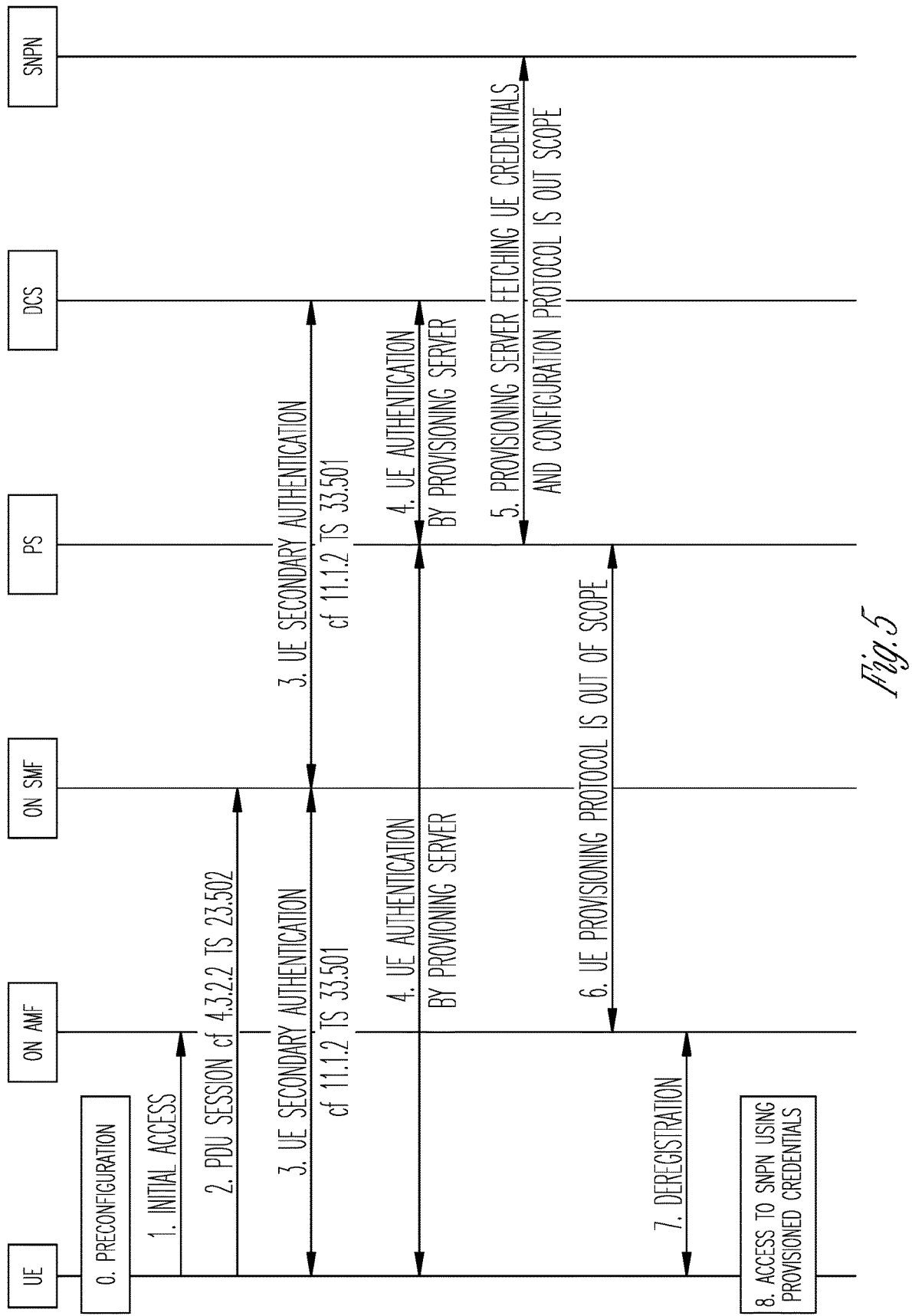
FIG. 5 illustrates UE onboarding for a remote provisioning procedure in accordance with some aspects.

FIG. 5 illustrates UE onboarding for a remote provisioning procedure in accordance with some aspects. In FIG. 5, a number of pre-conditions are assumed. The pre-conditions include that the UE is provisioned with default UE credentials and a unique UE identifier at the time of manufacture. The unique UE identifier is assumed to be unique within the DCS. The unique UE identifier may take the form of a NAI, which is composed of a user part and a realm part, which may identify the domain name of the DCS. The UE is provisioned with set of roots of trust certificate information that the UE may use to authenticate the O-SNPN during the primary authentication. The UE is not, however, provisioned with subscription credentials that grant access to a SO-SNPN. The O-SNPN that is used by the UE in the onboarding process is not necessarily the same as the SO-SNPN for which subscription credentials may be provisioned in the UE. The O-SNPN operator has access to a DCS, which may be used to verify that the UE is subject to onboarding based on the UE identifier and the associated default UE credentials. The DCS is used for UE authentication/authorization in the O-SNPN during the establishment of a PDU Session for onboarding purposes. The DCS owner can be inside or outside of the O-SNPN, e.g., the DCS can be owned by the device manufacturer, by an SNPN other than the O-SNPN, or by a 3$^{rd}$ party, for example.

In some deployments, the DCS and the Provisioning Server can be the same entity. In deployments where the DCS and the Provisioning Server are different entities, the DCS and the Provisioning Server may communicate with each other for the purpose of UE authentication based on the default UE credentials via an interface.

The SO-SNPN owning the subscription interacts with the Provisioning Server during the UE onboarding procedure and provides the corresponding UE's subscription credentials and UE's configuration data to be provisioned to the UE.

Operation 0 in FIG. 5 is UE pre-configuration: the UE is provisioned with default UE credentials that allow for successful UE authentication and a unique UE identifier. The configuration may also include information for selecting the SNPN to access the provisioning server.

At operation 1, the UE attempts initial access to the Onboarding SNPN (transmitting a registration request to the O-AMF). The UE at operation 1 engages in SNPN selection as well as a registration procedure. During selection of the SNPN, the UE selects the O-SNPN based on an indication in a system information broadcast (SIB) broadcasted by the O-SNPN (e.g., a "Support for onboarding" indicator). In this operation, if the UE wants to initiate onboarding, the UE may either automatically discover and select the O-SNPN network based on the broadcasted information or may present a list of available onboarding networks (ONs) to the user for manual selection. The UE may register to the O-SNPN for onboarding by including an indication, in a Registration Request, indicating that the registration is for UE onboarding.

During the registration procedure, the UE may provide device-specific information, e.g., the default UE credential and corresponding identity (encoded in SUPI format) to the network. The user may also provide the UE with additional information, such as an application identifier and/or Service Provider Identifier. A primary authentication using non-AKA (e.g., Extensible Authentication Protocol—Transport Layer Security (EAP-TLS)) based method may be performed. The SUPI may be of the type of NAI in the form of username@realm. The "username" may be either "anonymous" or the UE identity can be omitted if the subscriber identifier privacy is to be indicated by the SNPN. The UE performs one way authentication of the O-SNPN based on the O-SNPN's certificate in a from the O-AMF of the O-SNPN.

Operation 2 includes configuration a PDU session. In this operation, the UE obtains limited connectivity to the Provisioning Server using a Configuration PDU Session Establishment Request. In the Configuration PDU Session Establishment Request, the UE includes the DCS identity and may also include the provisioning server (PS) identity and/or SO-SNPN identity. When the UE provides the SO-SNPN identity, the SMF in the O-SNPN may decide to override the PS identity provided by the UE and send a new PS identity to the UE in a packet data unit (PDU) Session Establishment Accept as a Protocol Configuration Option (PCO) parameter. The PS identity received in the PDU Session Establishment Accept overrides any configured PS identity in the device. It is assumed that one and only one Configuration PDU session can be established, and connectivity of this PDU session is limited (cf. restricted local operator services (RLOS)), so that the UE can only access a Provisioning Server.

The PDU session establishment authentication/authorization at operation 2 and 3 may be performed as described in 3GPP TS 23.502 clause 4.3.2.3 and in TS 33.501 clause 11.1.2, each of which is herein incorporated by reference in its entirety. Secondary authentication may be triggered at operation 3 by the SMF during PDU Session establishment with the DCS. The SMF may select the DCS either based on the DCS identity sent from the UE to the SMF or based on the realm part of the UE identity.

The UE discovers the Provisioning Server at operation 4 using the stored PS identity. At this point, the stored PS identity is either the PS identity pre-configured in the UE, the PS identity entered manually by the user, or the PS identity received by the O-SNPN. If the UE still does not have a stored PS identity, then the UE may use a well-known fully qualified domain name (FQDN) to perform PS discovery. The UE may provide the provisioning server with the unique UE identifier, and may include the identity of the selected SO-SNPN. The provisioning server discovers the DCS using DCS identity sent from the UE to PS or based on the realm part of the unique UE identity and authenticates the UE. The provisioning server may then provide a secure connection for provisioning with the UE based on the default UE credentials when there is trust relationship between the DCS and PS.

The Provisioning Server may select the SO-SNPN owning the subscription at operation 5. The Provisioning Server accordingly may contact the future SO-SNPN owning the subscription to provide the subscription credentials for access to the SNPN owning the subscription, and may retrieve other UE configuration parameters. The Provisioning Server may select the SNPN owning the subscription in one of the following ways: if the UE is pre-configured with the identity of the future SNPN, the UE provides this identity to the Provisioning Server; the Provisioning Server determines the future SNPN by comparing the UE identity with a configured onboarding list. When the Onboarding network is the same as the SNPN owning the subscription of the UE, the Provisioning Server is owned by the Onboarding Network.

At operation 6, the Provisioning Server provisions the UE's subscription credentials for the SO-SNPN and other configuration information into the UE over the secure connection.

Upon successful provisioning in operation 6, at operation 7 the UE may release the Configuration PDU Session and deregister from the O-SNPN. Upon a successful de-registration, at operation 8 the UE may initiate a regular procedure, including a selection of a SO-SNPN, registration using the provisioned credentials with the SO-SNPN owning the subscription, and PDU Session establishment(s). Depending on the provisioned subscription credentials, the UE may select an SNPN that is the same or different from the SNPN owning the credentials.

Figure 6:
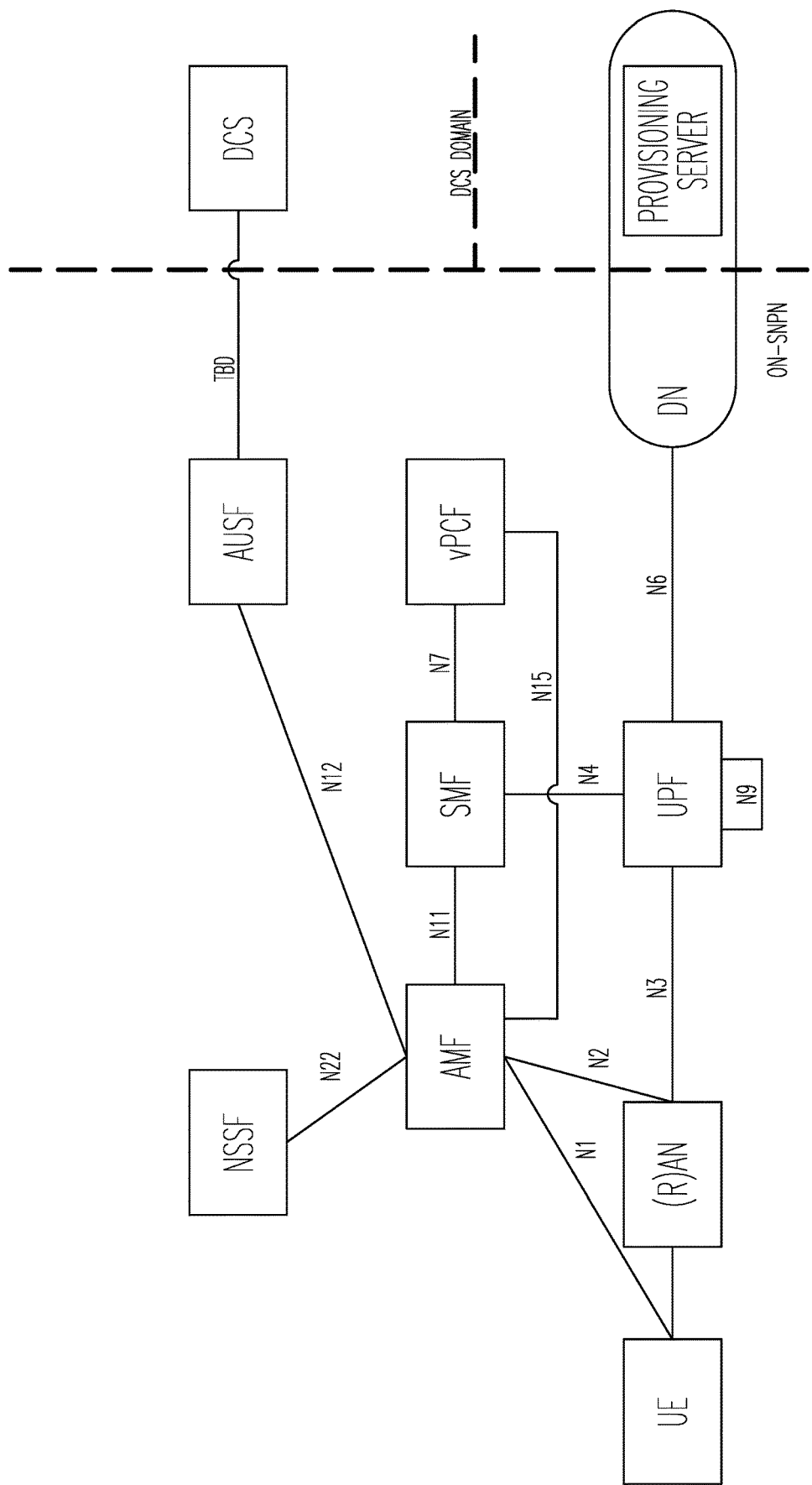
FIG. 6 illustrates UE onboarding architecture in an onboarding SNPN (O-SNPN or ON-SNPN) with a Default Credential Server (DCS) in accordance with some aspects.
Figure 7:
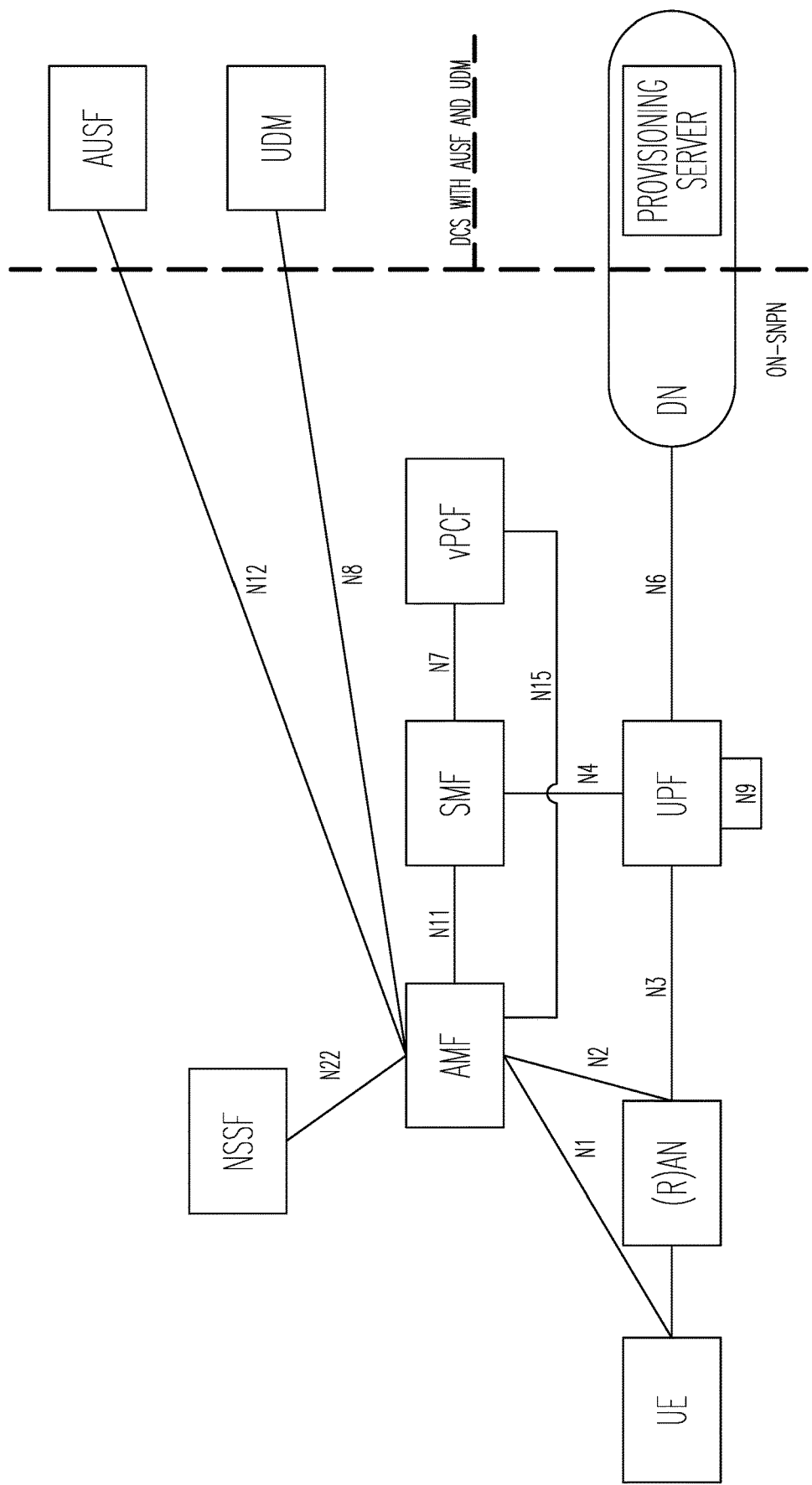
FIG. 7 illustrates UE onboarding architecture in an O-SNPN when the DCS includes an authentication server function (AUSF) and a unified data management (UDM) in accordance with some aspects.
Figure 8:
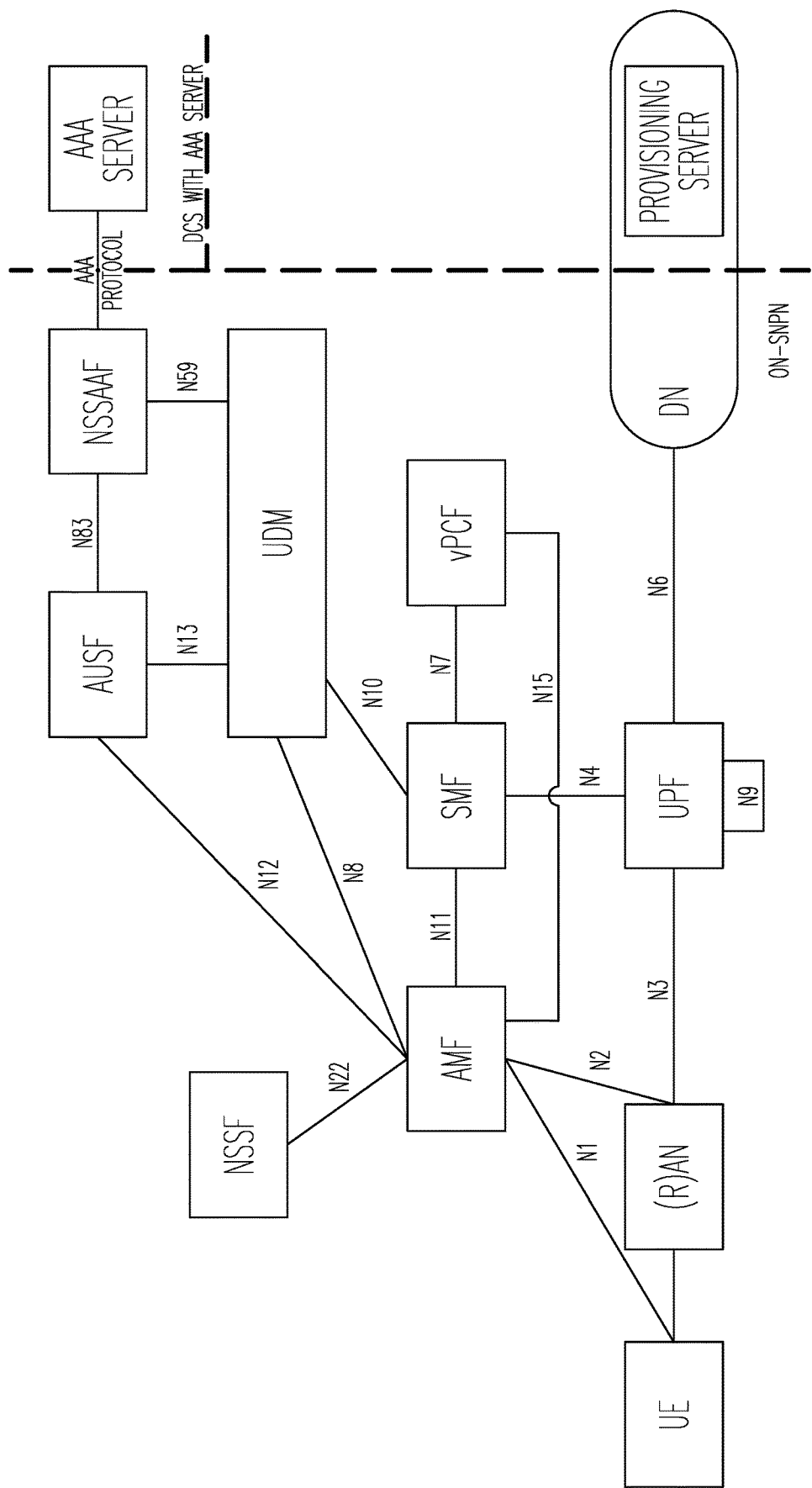
FIG. 8 illustrates UE onboarding architecture in an O-SNPN when the DCS includes an authorization and authentication (AAA) server used for primary authentication in accordance with some aspects.
Figure 9:
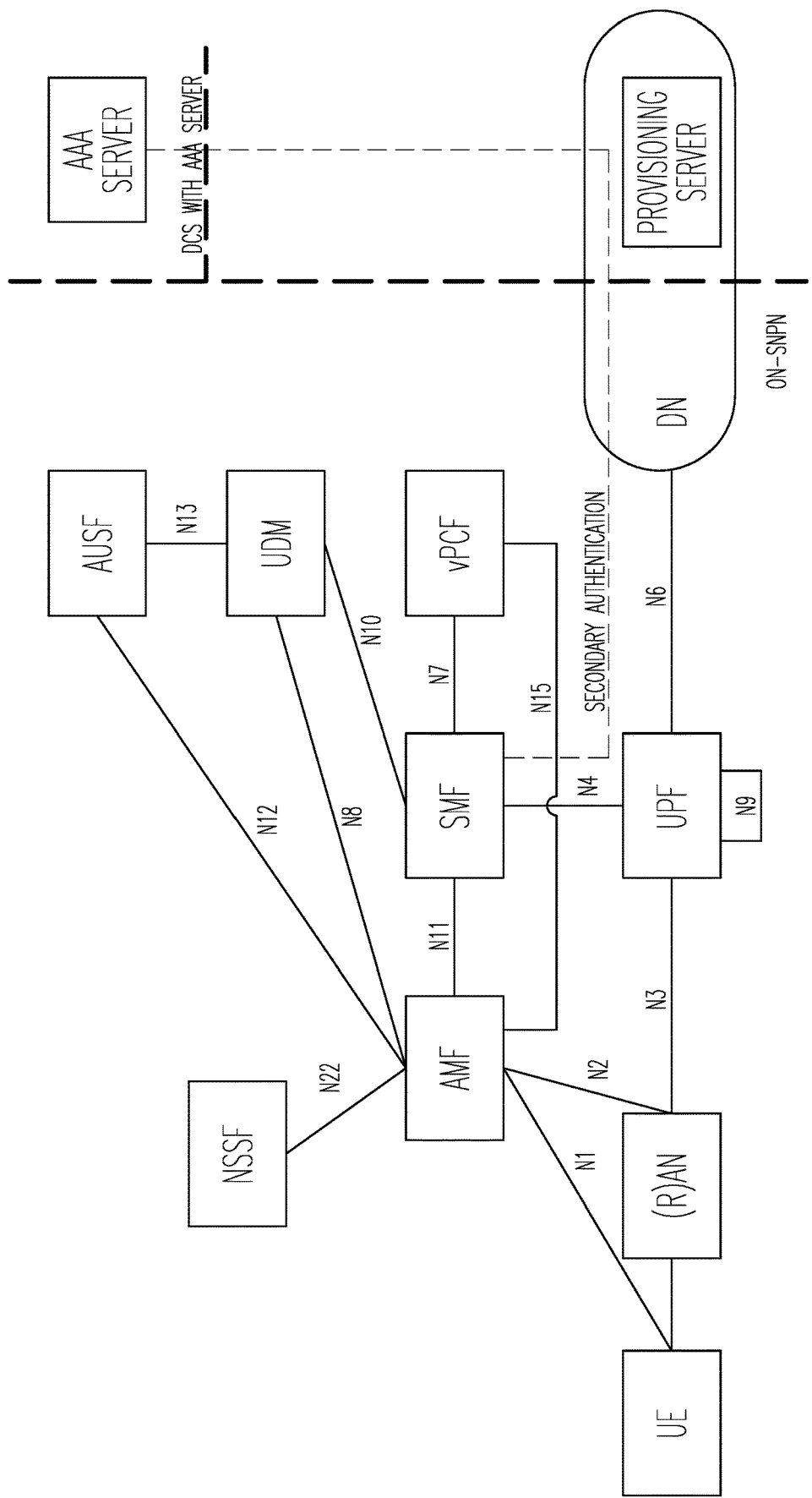
FIG. 9 illustrates UE onboarding architecture in an O-SNPN when the DCS includes an AAA server that is not used for primary authentication in accordance with some aspects.

FIGS. 6-9 illustrate different UE onboarding architectures. In particular, FIG. 6 illustrates UE onboarding architecture in an O-SNPN or ON-SNPN with a DCS in accordance with some aspects. FIG. 7 illustrates UE onboarding architecture in an O-SNPN when the DCS includes an AUSF and a UDM in accordance with some aspects. FIG. 8 illustrates UE onboarding architecture in an O-SNPN when the DCS includes an AAA server used for primary authentication in accordance with some aspects. FIG. 9 illustrates UE onboarding architecture in an O-SNPN when the DCS includes an AAA server that is not used for primary authentication in accordance with some aspects.

The AUSF in the ON-SNPN interfaces with the DCS owned by an entity that is internal or external to the ON-SNPN. The dotted lines in FIGS. 6 and 7 indicate that domains (e.g., DCS domain, private virtual server (PVS) domain, and SO-SNPN) may not be separated depending on the deployment scenario. When the DCS is involved during mutual primary authentication during the Onboarding procedure (as in FIGS. 6-8), the following apply:

When the DCS includes an AUSF and a UDM functionality, then the AMF selects the AUSF and UDM in the DCS domain. The ON-SNPN and DCS domain are connected via N32 and SEPP which are not shown.

When the DCS includes AAA server functionality, then the AMF selects the AUSF in the ON-SNPN. Based on the local configuration, the AUSF skips the UDM selection and performs primary authentication towards the DCS with the AAA server functionality. The AUSF uses an NSSAAF (and the NSSAAF may use an AAA-P which is not shown) to relay EAP messages towards the DCS including a AAA Server. If a given DCS supports both AUSF/UDM functionality as depicted in FIG. 7 and AAA server functionality as depicted in FIG. 8, the DCS uses a separate Home Network Identifier for a DCS with the AUSF/UDM and for a DCS with AAA server functionality to ensure correct selection of the NFs.

When the DCS is not involved during primary authentication (as in FIG. 9), the following applies:

The AMF selects a local AUSF and performs primary authentication towards the local AUSF using UE default credentials as described in TS 33.501.

Upon establishment of the restricted PDU Session the ON-SNPN may trigger secondary authentication procedure with the DCS using UE default credentials as described in clause 11.1 of TS 33.501. If the secondary authentication fails, the SMF rejects the PDU Session for onboarding. Based on local policy the AMF can deregister the UE as described in clause 5.30.2.10.2.7 of TS 33.501.

The DCS and PVS can be owned by an administrative entity that can be different from either the ON-SNPN or SO-SNPN.

Registration for UE Onboarding

When the user or UE has selected an ON-SNPN according to clause 5.30.2.10.2.5 of TS 33.501, the UE establishes an RRC connection towards the NG-RAN node of the ON-SNPN. The UE provides an indication in RRC Connection Establishment that the RRC connection is for onboarding as defined in TS 38.331. This indication allows the NG-RAN node to select an appropriate AMF that supports the UE onboarding procedures. The UE indicates the ON-SNPN as the selected network, and the NG-RAN node shall indicate the selected PLMN ID and NID of the ON-SNPN to the AMF. As the configuration information in the UE does not include any S-NSSAI and DNN used for onboarding, the UE does not include S-NSSAI and DNN in RRC when the UE registers for UE onboarding purposes to the ONN.

The UE initiates the NAS registration procedure by sending a NAS Registration Request message with the following characteristics:

The UE sets the 5GS Registration Type to the value "SNPN Onboarding" indicating that the registration request is for onboarding.

The UE provides a SUCI derived from a SUPI as specified in TS 23.003 and TS 33.501. The SUPI uniquely identifies the UE and is derived from the Default UE Credentials. The ON-SNPN may determine the corresponding DCS identity or address/domain, based on the SUCI (i.e., based on the Home Network Identifier of the SUCI).

The UE does not include a Requested NSSAI in NAS signalling when it registers for UE onboarding purposes to the ONN.

The AMF supporting UE onboarding is configured with AMF Onboarding Configuration Data that may include e.g.: the S-NSSAI and DNN to be used for UE onboarding or a configured SMF for the DNN and S-NSSAI used for UE onboarding; Information to enable User Plane Remote Provisioning of UEs in SNPNs, see clause 5.30.2.10.4 of TS 33.501; Information to use a local AUSF(s) within the ON-SNPN for onboarding of UEs with a SUCI for a DCS with AAA server or for onboarding of UEs in the case where the DCS is not involved during primary authentication.

When the AMF receives a NAS Registration Request with a 5GS Registration Type set to "SNPN Onboarding", the AMF starts an authentication procedure towards the AUSF, the authentication procedure is specified in TS 33.501. The AMF selects an appropriate AUSF as described in clause 6.3.4 of TS 33.501 based on the Home Network Identifier of the SUCI used during onboarding or based on local configuration in the AMF. The AMF also applies the AMF Onboarding Configuration Data e.g., used to restrict UE network usage to only onboarding for user plane remote provisioning of UE as described in clause 5.30.2.10.4.3 of TS 33.501. The AMF also stores in the UE context in AMF an indication that the UE is registered for SNPN onboarding. Upon successful authentication from the AUSF, the AMF informs the UE about the result of the registration. If the UE is not successfully authenticated, the AMF rejects the registration procedure for onboarding, and the UE may select a different ON-SNPN to attempt to register.

Deregistration from the ON-SNPN for Onboarding Registered UE

Once remote provisioning of SO-SNPN credentials is completed, the UE may initiate deregistration from the ON-SNPN. Based on ON-SNPN policies, the AMF may start an implementation specific timer once the UE has registered to the ON-SNPN for the purpose of onboarding. Expiry of this timer triggers the AMF to deregister the onboarding registered UE from the ON-SNPN. The AMF may also deregister the UE when the AMF determines that the restricted PDU Session has been released by the SMF.

When AMF re-allocation occurs for a UE registered for SNPN onboarding during mobility registration update procedure as described in TS 23.502 in clause 4.2.2.2.2 of TS 33.501 or during N2 based handover as described in TS 23.502 clause 4.9.1.3 of TS 33.501, the new AMF supporting UE SNPN onboarding should be selected as described in clause 6.3.5 of TS 33.501. If the new AMF receives in UE context the indication that the UE is registered for SNPN onboarding, the new AMF may start an implementation specific timer for when to deregister the UE when the new AMF completes the Registration procedure (i.e., sends Registration Accept to the UE) or completes the N2 based handover procedure.

This specific timer is used to prevent onboarding registered UEs from staying at the ON-SNPN indefinitely. When the Onboarding network is a PLMN and the UE's subscription only allows for Remote Provisioning, then based on PLMN policies, the AMF can start an implementation specific timer once the UE has registered to the PLMN. Expiry of this timer triggers the AMF to deregister the UE from the PLMN. This specific timer is used to prevent registered UEs that only allow for Remote Provisioning from staying at the PLMN indefinitely.

The Network Slice-specific and SNPN Authentication and Authorization Function (NSSAAF) supports the following functionality:

Support for Network Slice-Specific Authentication and Authorization as specified in TS 23.502 with a AAA Server (AAA-S). If the AAA-S belongs to a third party, the NSSAAF may contact the AAA-S via a AAA proxy (AAA-P). Support for access to SNPN using credentials from Credentials Holder using AAA server (AAA-S) as specified in clause 5.30.2.9.2 of TS 33.501 or using credentials from Default Credentials Server using AAA server (AAA-S) as specified in clause 5.30.2.10.2 of TS 33.501. If the Credentials Holder or Default Credentials Server belongs to a third party, the NSSAAF may contact the AAA server via a AAA proxy (AAA-P). When the NSSAAF is deployed in a PLMN, it supports Network Slice-Specific Authentication and Authorization, while when the NSSAAF is deployed in a SNPN may support Network Slice-Specific Authentication and Authorization and/or access to SNPN using credentials from Credentials Holder.

The Security Edge Protection Proxy (SEPP) acts as a non-transparent proxy node. The SEPP protects application layer control plane messages between two NFs belonging to different PLMNs or SNPNs that use the N32 interface to communicate with each other. The receiving SEPP shall be able to verify whether the sending SEPP is authorized to use the PLMN ID or SNPN ID in the received N32 message.

The Network slice specific and SNPN authentication and authorization function (NSSAAF) handles the Network Slice Specific Authentication requests from the serving AMF as specified in clause 16. The NSSAAF also supports functionality for access to the SNPN using credentials from Credentials Holder using the AAA Server. The NSSAAF translates Service based messages from the serving AMF or AUSF to AAA protocols towards AAA-P/AAA-S.

Service Request Process

Figure 10:
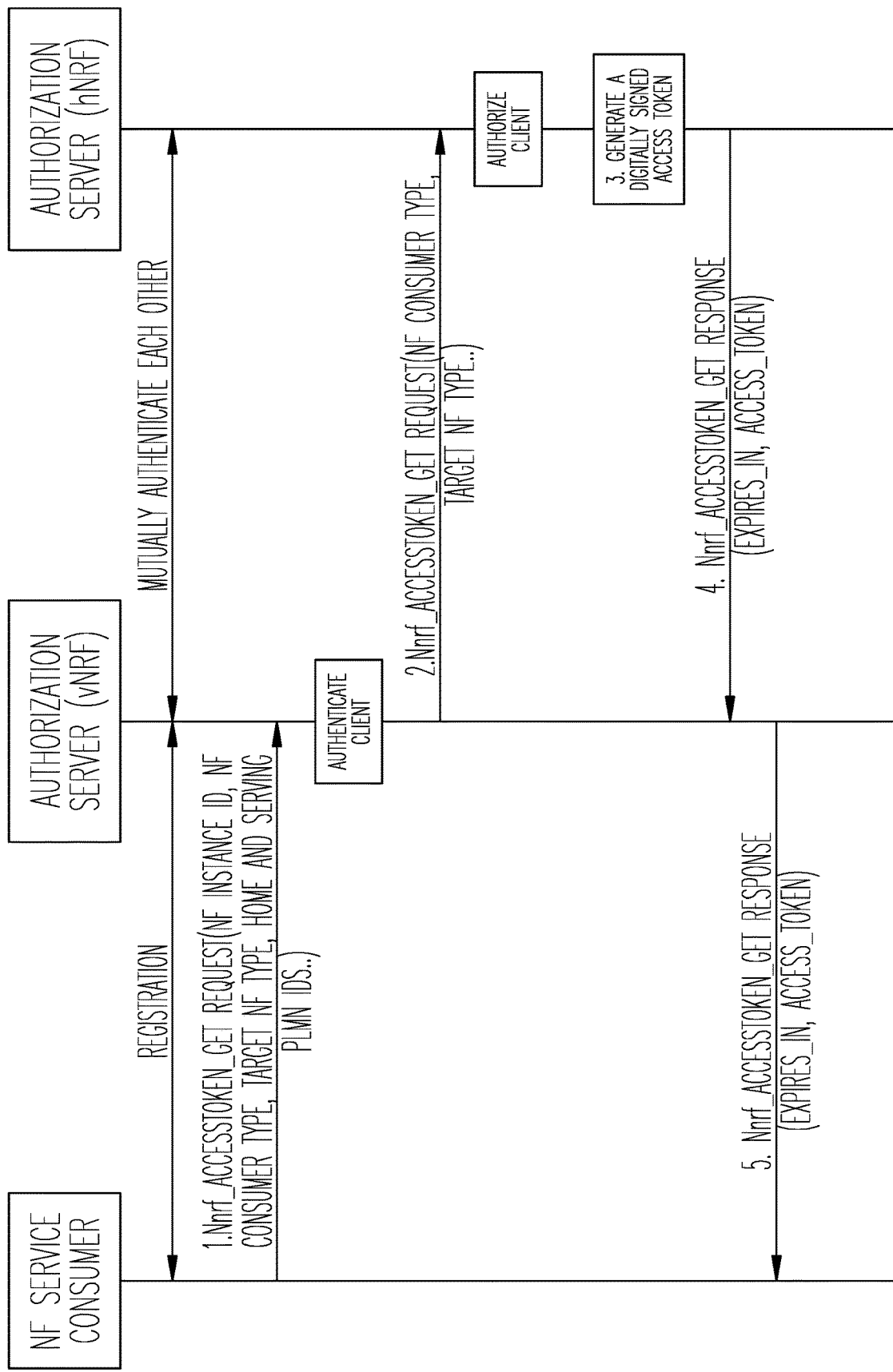
FIG. 10 illustrates network function (NF) Service Consumer obtaining access token before NF Service access (roaming) in accordance with some aspects.

The complete service request is two-step process including requesting an access token by NF Service Consumer, and then verification of the access token by NF Service Consumer. FIG. 10 illustrates NF Service Consumer obtaining access token before NF Service access (roaming) in accordance with some aspects.

Pre-requisite: The NF Service consumer (OAuth2.0 client) is registered with the vNRF (Authorization Server in the vPLMN). The hNRF and NF service producer share the required credentials. Additionally, the NF Service producer (OAuth2.0 resource server) is registered with the hNRF (Authorization Server in the hPLMN) with "additional scope" information per NF type. The two NRFs have mutually authenticated each other. The NRF in the serving PLMN and NF service consumer have mutually authenticated each other. For SNPNs with Credentials Holder using AUSF and UDM for primary authentication, the NF Service Consumer and the vNRF are located in the SNPN while the hNRF is located in the Credentials Holder.

1a. Access Token Request for Accessing Services of NF Service Producers of a Specific NF Type The following procedure describes how the NF Service Consumer obtains an access token for NF Service Producers of a specific NF type for use in the roaming scenario.

1. The NF Service Consumer shall invoke Nnrf_AccessToken_Get Request (NF Instance Id of the NF Service Consumer, the requested "scope" including the expected NF Service Name (s) and optionally "additional scope" information (i.e. requested resources and requested actions (service operations) on the resources), NF Type of the expected NF Service Producer instance, NF type of the NF Service Consumer, home and serving PLMN IDs, optionally list of NSSAIs or list of NSI IDs for the expected NF Service Producer instances, optionally NF Set ID of the expected NF Service Producer) from NRF in the same PLMN.

For SNPNs with Credentials Holder using AUSF and UDM for primary authentication, the SNPN ID of the serving SNPN is included instead of the serving PLMN ID and the SNPN ID or the PLMN ID of the Credentials Holder is included instead of the home PLMN ID.

2. The NRF in serving PLMN shall identify the NRF in home PLMN (hNRF) based on the home PLMN ID, and request an access token from hNRF as described in clause 4.17.5 of TS 23.502. The vNRF shall forward the parameters it obtained from the NF Service Consumer, including NF Service Consumer type, to the hNRF.

3. The hNRF checks whether the NF Service Consumer is authorized to access the requested service(s). If the NF Service Consumer is authorized, the hNRF shall generate an access token with appropriate claims included as defined in clause 13.4.1.1. The hNRF shall digitally sign the generated access token based on a shared secret or private key as described in RFC 7515. If the NF service consumer is not authorized, the hNRF shall not issue an access token to the NF Service Consumer.

The claims in the token shall include the NF Instance Id of NRF (issuer), NF Instance Id of the NF Service Consumer appended with its PLMN ID (subject), NF type of the NF Service Producer appended with its PLMN ID (audience), expected services name(s), (scope) and expiration time (expiration), and optionally "additional scope" information (allowed resources and allowed actions (service operations) on the resources). The claims may include a list of NSSAIs or NSI IDs for the expected NF Service Producer instances. The claims may include the NF Set ID of the expected NF Service Producer instances.

For SNPNs with Credentials Holder using AUSF and UDM for primary authentication, the SNPN ID of the serving SNPN is included instead of the NF Service Consumer's PLMN ID and the SNPN ID or the PLMN ID of the Credentials Holder is included instead of the NF Service Producer's PLMN ID.

4. If the authorization is successful, the access token shall be included in Nnrf_AccessToken_Get Response message to the vNRF. Otherwise it shall reply based on Oauth 2.0 error response defined in RFC 6749.

5. The vNRF shall forward the Nnrf_AccessToken_Get Response or error message to the NF Service Consumer. The NF Service Consumer may store the received token(s). Stored tokens may be re-used for accessing service(s) from NF Service Producer NF type listed in claims (scope, audience) during their validity time. The other parameters (e.g., the expiration time, allowed scope) sent by NRF in addition to the access token are described in TS 29.510.

1b. Obtain Access Token for Accessing Services of a Specific NF Service Producer Instance/NF Service Producer Service Instance The following steps describes how the NF Service Consumer obtains an access token before service access to a specific NF Service Producer instance/NF Service Producer service instance.

1. The NF Service Consumer shall request an access token from the NRF for a specific NF Service Producer instance/NF Service Producer service instance. The request shall include the NF Instance Id of the requested NF Service Producer, appended with its PLMN ID, the expected NF service name and NF Instance Id of the NF Service Consumer, appended with its PLMN ID.

For SNPNs with Credentials Holder using AUSF and UDM for primary authentication, the SNPN ID of the serving SNPN is included instead of the NF Service Consumer's PLMN ID and the SNPN ID or the PLMN ID of the Credentials Holder is included instead of the NF Service Producer's PLMN ID.

2. The NRF in the visiting PLMN shall forward the request to the NRF in the home PLMN.

3. The NRF in the home PLMN checks whether the NF Service Consumer is authorized to use the requested NF Service Producer instance/NF Service Producer service instance and shall then proceed to generate an access token with the appropriate claims included. If the NF Service Consumer is not authorized, the NRF in the home PLMN shall not issue an access token to the NF Service Consumer.

The claims in the token shall include the NF Instance Id of NRF (issuer), NF Instance Id of the NF Service Consumer appended with its PLMN ID (subject), NF Instance Id of the requested NF Service Producer appended with its PLMN ID (audience), expected service name(s) (scope) and expiration time (expiration).

For SNPNs with Credentials Holder using AUSF and UDM for primary authentication, the SNPN ID of the serving SNPN is included instead of the NF Service Consumer's PLMN ID and the SNPN ID or the PLMN ID of the Credentials Holder is included instead of the NF Service Producer's PLMN ID.

4. The token shall be included in the Nnrf_AccessToken_Get response sent to the NRF in the visiting PLMN.

5. The NRF in the visiting PLMN shall forward the Nnrf_AccessToken_Get response message to the NF Service Consumer. The NF Service Consumer may store the received token(s). Stored tokens may be re-used for accessing service(s) from NF Instance Id or several NF Instance Id(s) of the requested NF Service Producer listed in claims (scope, audience) during their validity time.

Step 2: Service Access Request Based on Token Verification

Figure 11:
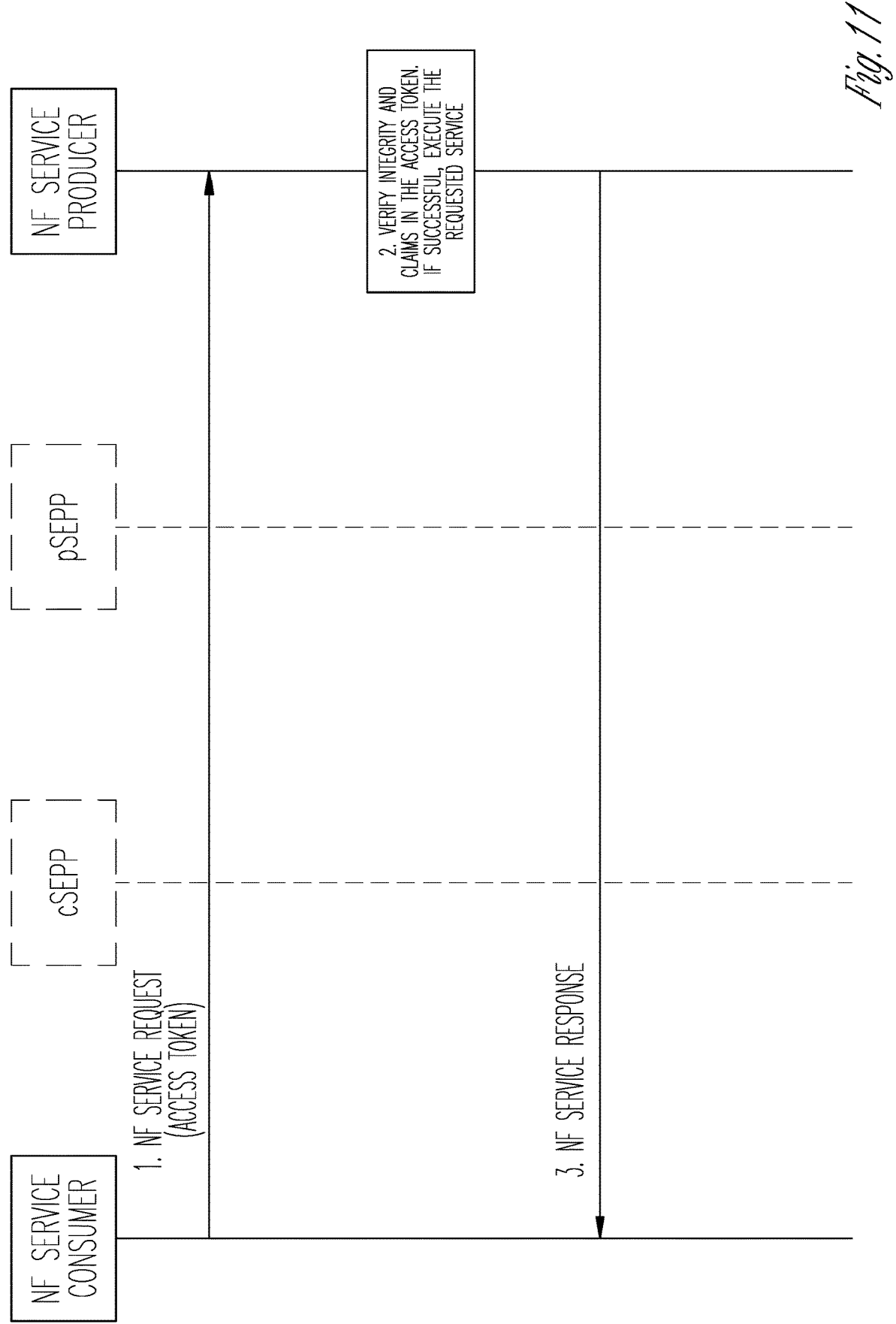
FIG. 11 illustrates NF Service Consumer requesting service access with an access token in roaming case in accordance with some aspects.

FIG. 11 illustrates NF Service Consumer requesting service access with an access token in roaming case in accordance with some aspects.

In addition to the steps described in the non-roaming scenario in 13.4.1.1, the NF Service Producer shall verify that the PLMN-ID contained in the API request is equal to the one inside the access token.

The NF Service Producer shall check that the home PLMN ID of audience claim in the access token matches its own PLMN identity.

For SNPNs with Credentials Holder using AUSF and UDM for primary authentication, the NF Service Producer verifies the SNPN ID of the serving SNPN contained in the API request instead of the PLMN-ID, and the SNPN ID or the PLMN ID of the Credentials Holder instead of the home PLMN ID.

The pSEPP shall check that the serving PLMN ID of subject claim in the access token matches the remote PLMN ID corresponding to the N32-f context Id in the N32 message.

14.4.X Nnssaaf_AIW Services
14.4.X.1 General

The following table illustrates the security related services provided by the NSSAAF for primary authentication in SNPN with Credentials holder using AAA server (see clause I.2.2.z).

TABLE 14.4.X.1-1

NF services for CH using AAA for primary authentication provided by NSSAAF

| Service Name | Service Operations | Operation Semantics | Example Consumer(s) |
| --- | --- | --- | --- |
| Nnssaaf_AIW | Authenticate | Request/Response | AUSF |

14.4.X.2 Nnssaaf_AIW_Authenticate service operation
Service operation name: Nnssaaf_AIW_Authenticate
Description: The NSSAAF provides Authentication and Authorization service to the consumer NF by relaying EAP or EAP-TTLS inner method messages towards a AAA Server and performing related protocol conversion as needed. Input, Required:
1) In EAP Authentication:
   a) In the initial authentication request: SUPI.
   b) In subsequent authentication requests: EAP message.
   2) In case EAP-TTLS mechanisms are implemented: inner method container.
Input, Optional: None
   Output, Required:
   1) In EAP authentication: EAP message, authentication result and if success MSK and SUPI.
   2) In case EAP-TTLS mechanisms are implemented: inner method container.
Output, Optional: None
   Authentication in standalone non-public networks
   I.2.1 General One of the major differences of non-public networks is that authentication methods other than AKA based ones may be used in a standalone non-public network (SNPN). When an AKA-based authentication method is used, clause 6.1 shall apply. When an authentication method other than 5G AKA or EAP-AKA' is used, only the non-AKA specific parts of clause 6.1 shall apply. An example of running such an authentication method is given in Annex B with EAP-TLS.

The choice of the supported authentication methods for access to SNPNs follows the principles described in clauses I.2.2 and I.2.3.

I.2.2 EAP Framework, Selection of Authentication Method, and EAP Method Credentials
I.2.2.x General The EAP authentication framework is supported by the 5GS as described in clause 6.1.1.2. The UE and the serving network may support 5G AKA, EAP-AKA', or any other key-generating EAP authentication method. Selection of the authentication methods is dependent on NPN configuration. When an EAP authentication method other than EAP-AKA' is selected, the chosen method determines the credentials needed in the UE and network. These credentials, called the EAP-method credentials, shall be used for authentication.

I.2.2.z Credentials Holder Using AAA Server for Primary Authentication
I.2.2.z.1 General The procedures described in this clause enables UEs to access an SNPN which makes use of a credential management system managed by a credential provider external to the SNPN.

In this scenario the authentication server role is taken by the AAA Server. The AUSF acts as EAP authenticator and interacts with the AAA Server to execute the primary authentication procedure. The architecture for SNPN access using credentials from a Credentials Holder using AAA Server is described in clause 5.30.2.9.2 of TS 23.501.

I.2.2.z.2 Procedure

Figure 12A:
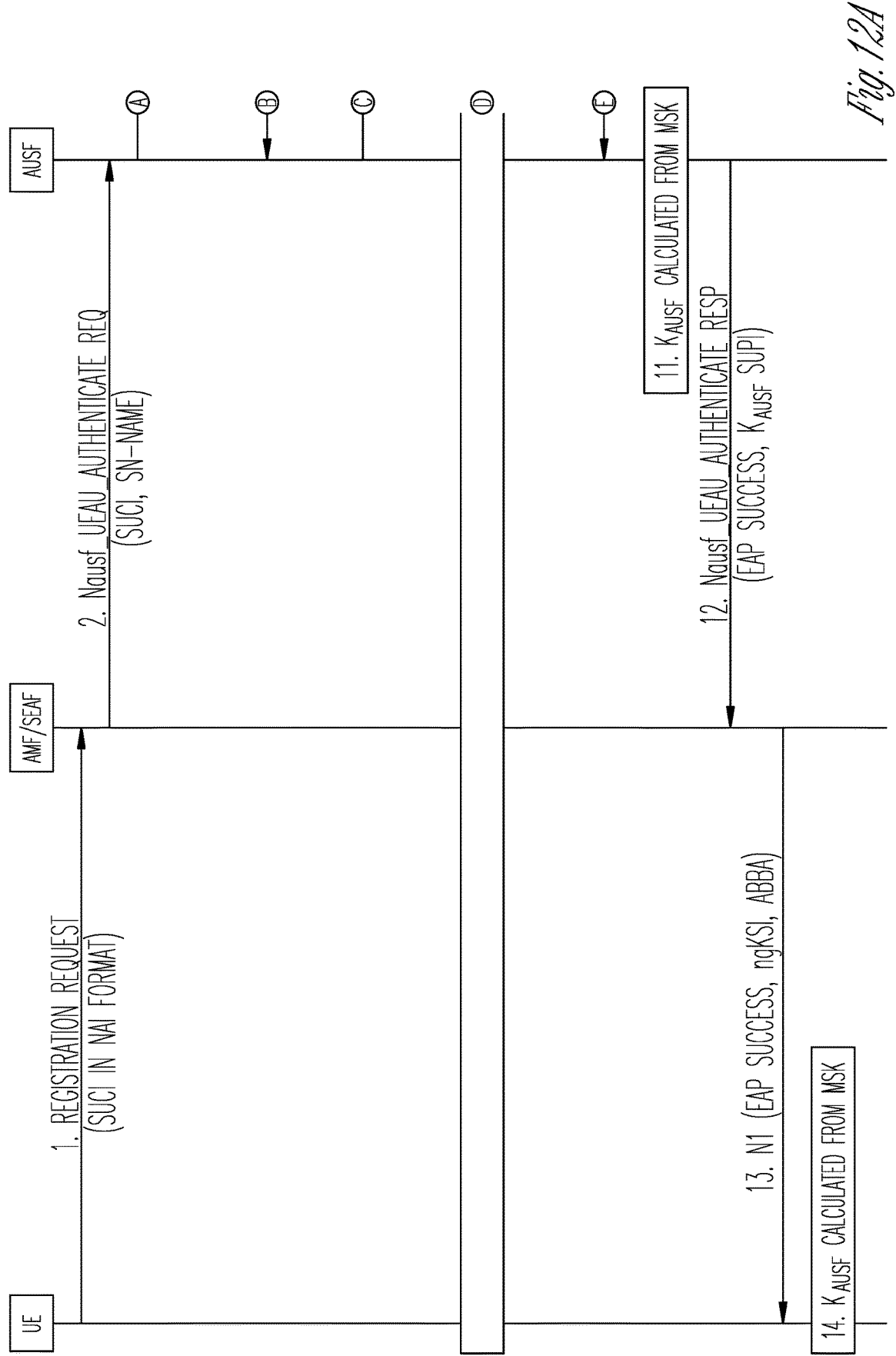
FIGS. 12A and 12B illustrates primary authentication with an external domain in accordance with some aspects.
Figure 12B:
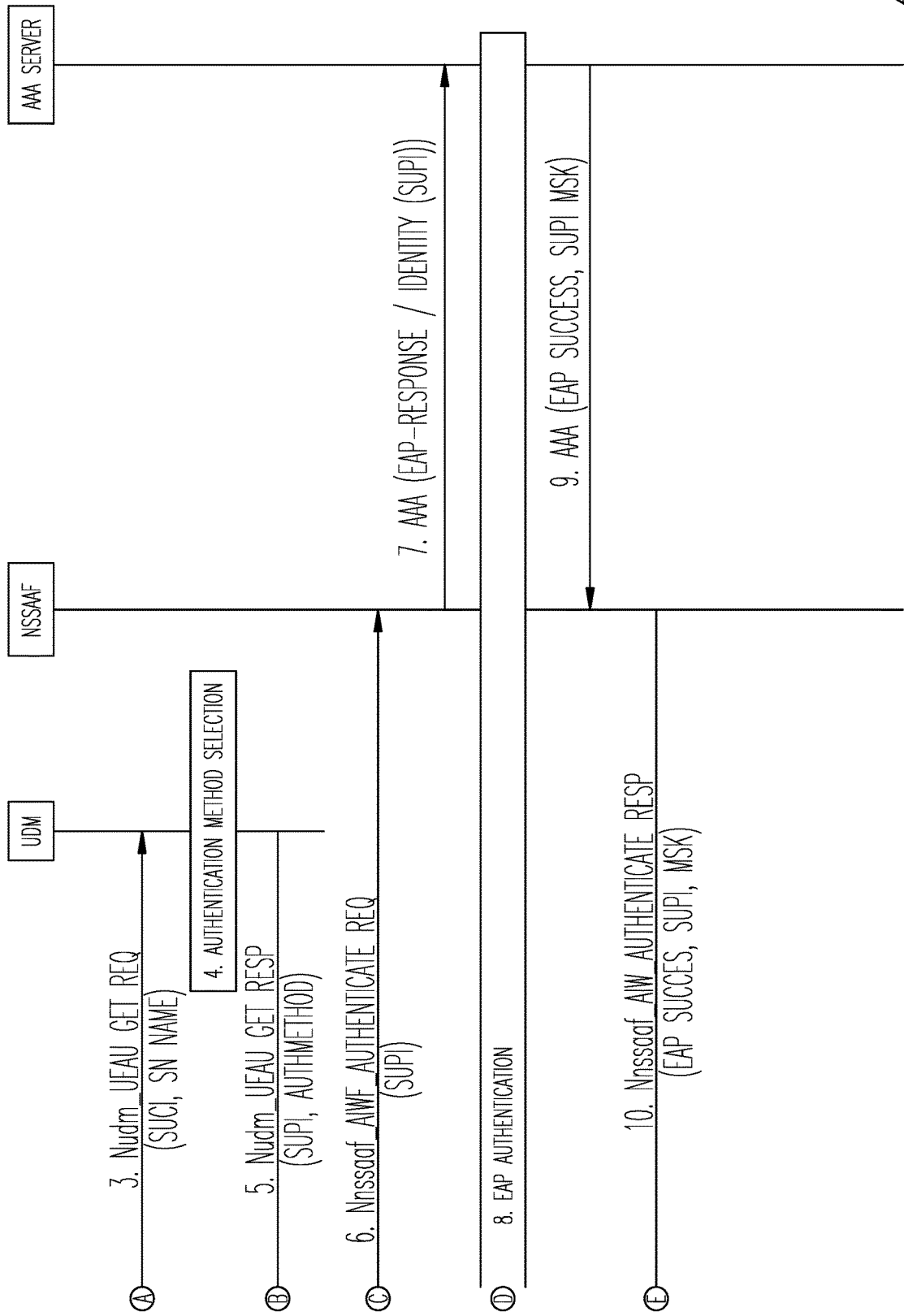

FIGS. 12A and 12B illustrates primary authentication with an external domain in accordance with some aspects.

0. The UE shall be configured with credentials from the Credentials holder e.g. SUPI containing a network-specific identifier and credentials for the key-generating EAP-method used. As part of configuration of the credentials, the UE shall also be configured with an indication that the UE shall use MSK for the derivation of $K_{AUSF}$ after the success of the primary authentication. The exact procedures used to configure the UE are not specified in this document. It is further assumed that there exists a trust relation between the SNPN and the Credentials holder AAA Server. These entities need to be mutually authenticated, and the information transferred on the interface need to be confidentiality, integrity and replay protected.

1. The UE shall select the SNPN and initiate UE registration in the SNPN. For construction of the SUCI, existing methods in clause 6.12 can be used. If the home network public key of the SNPN is not provisioned in the UE, the UE shall create a SUCI using null scheme with anonymised SUPI as described in Annex B.

2. The AMF within the SNPN shall initiate a primary authentication for the UE using a Nausf_UEAuthentication_Authenticate service operation with the AUSF. The AMF shall select an AUSF based on the HNI of the SUCI (i.e. realm for NSI SUPI type) presented by the UE as specified in TS 23.501.

3. The AUSF shall initiate a Nudm_UEAuthentication_Get service operation. The AUSF shall select a UDM also using the SUCI/SUPI provided by the AMF as specified in TS 23.501. SUPI will be used instead of SUCI in the case of a re-authentication.

4. In case the UDM receives a SUCI, the UDM shall resolve the SUCI to the SUPI before checking the authentication method applicable for the SUPI. The UDM decides to run primary authentication with an external entity based on subscription data or by looking at the realm part of the SUPI in NAI format. In case the UDM receives an anonymous SUCI that does not contain the realm part, the UDM shall abort the procedure. If contains, the UDM authorizes the UE based on realm part of SUCI and send the anonymous SUPI and the indicator to the AUSF as described in step 5. The anonymous SUPI shall be a NAI format as described in clause B.2.1.2.2.

5. The UDM shall provide the AUSF with the UE real SUPI or anonymous SUPI and shall indicate to the AUSF to run primary authentication with an external Credentials holder. When a Credentials Holder using AAA Server is used for primary authentication, the AUSF uses the MSK to derive $K_{AUSF}$. It is strongly recommended that the same credentials that are used for authentication between UE and the 5G SNPN are not used for the authentication between the UE and a non-5G network, assuming that 5G SNPN and non-5G network are in different security domains. MSKs obtained from the non-5G network could be used to impersonate the 5G SNPN towards the UE.

6. Based on the indication from the UDM, the AUSF shall select an NSSAAF as defined in 3GPP TS 23.501 and initiate a Nnssaaf_AIWF_Authenticate service operation towards that NSSAAF as defined in clause 14.4.x.

7. The NSSAAF shall select AAA Server based on the domain name corresponding to the realm part of the SUPI. The NSSAAF shall perform related protocol conversion and relay EAP messages to the AAA Server.

8. The UE and AAA Server shall perform mutual authentication. The AAA Server shall act as the EAP Server for the purpose of primary authentication. The EAP Identity received by the AAA Server in the EAP-Response/Identity message in step 7 may contain anonymized SUPI. In such cases, AAA Server uses the EAP-method specific EAP Identity request/response messages to obtain the UE identifier as part of the EAP authentication between the UE and the AAA Server.

9. After successful authentication, the MSK and the SUPI (i.e., the UE identifier that is used for the successful EAP authentication) shall be provided from the AAA Server to the NSSAAF.

10. The NSSAAF returns the MSK and the SUPI to the AUSF using the Nnssaaf_AIWF_Authenticate service operation response message. The SUPI received from the AAA shall be used when deriving 5G keys (e.g., $K_{AMF}$) that requires SUPI as an input for the key derivation.

11. The AUSF shall use the most significant 256 bits of MSK as the $K_{AUSF}$. The AUSF shall also derive $K_{SEAF}$ from the $K_{AUSF}$ as defined in Annex A.6.

12. The AUSF shall send the successful indication together with the SUPI of the UE to the AMF together with the resulting $K_{SEAF}$.

13. The AMF shall send the EAP success in a NAS message.

14. The UE shall derive the $K_{AUSF}$ from MSK as described in step 11 according to the pre-configured indication as described in step 0.

Key Hierarchy, Key Derivation and Key Distribution

I.2.3.x General

Figure 13:
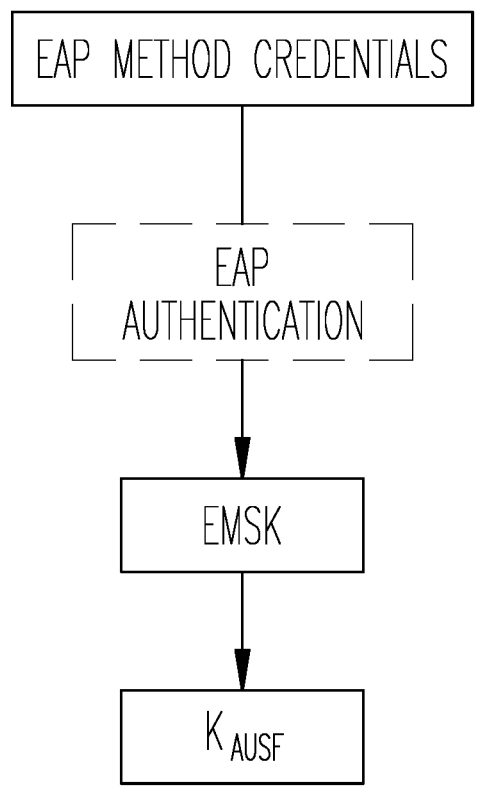
FIG. 13 illustrates key derivation in accordance with some aspects.

FIG. 13 illustrates key derivation in accordance with some aspects.

The text in clauses 6.2.1 and 6.2.2 cannot apply directly for an EAP authentication method other than EAP-AKA' as these clauses assume that an AKA-based authentication method is used. The major differences are the way in which $K_{AUSF}$ is calculated and that the UDM/ARPF is not necessarily involved in the key derivation or distribution.

Depending on the selected authentication method, the $K_{AUSF}$ is generated as follows:

For 5G AKA and EAP-AKA' refer to clause 6.2.1.

When using a key-generating EAP authentication method other than EAP-AKA', the key derivation of $K_{AUSF}$ is based on the EAP-method credentials in the UE and AUSF and shall be done as shown in FIG. 13. For EAP authentication methods other than EAP-AKA', this key derivation replaces clauses 6.2.1 and 6.2.2 for the generation of $K_{AUSF}$.

$K_{AUSF}$ shall be derived by the AUSF and UE from the EMSK created by the EAP authentication as for EAP-AKA'.

I.2.3.y Credentials Holder Using AAA Server for Primary Authentication

Figure 14:
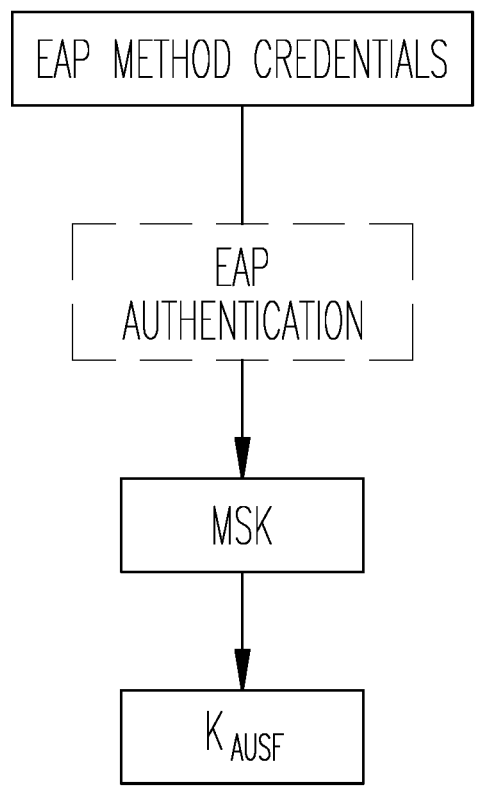
FIG. 14 illustrates key derivation in accordance with some aspects.
Figure 15A:
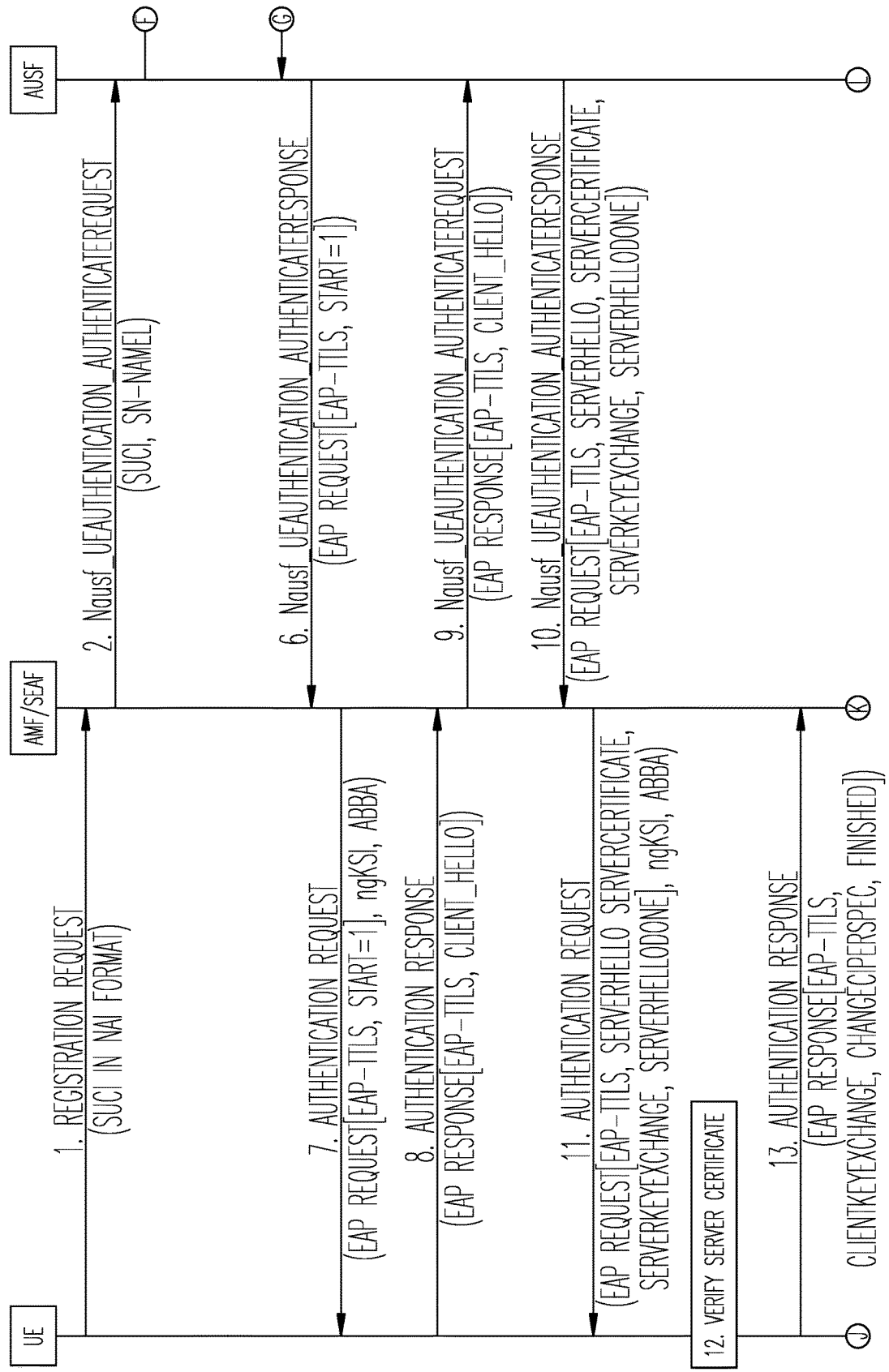
Figure 15D:
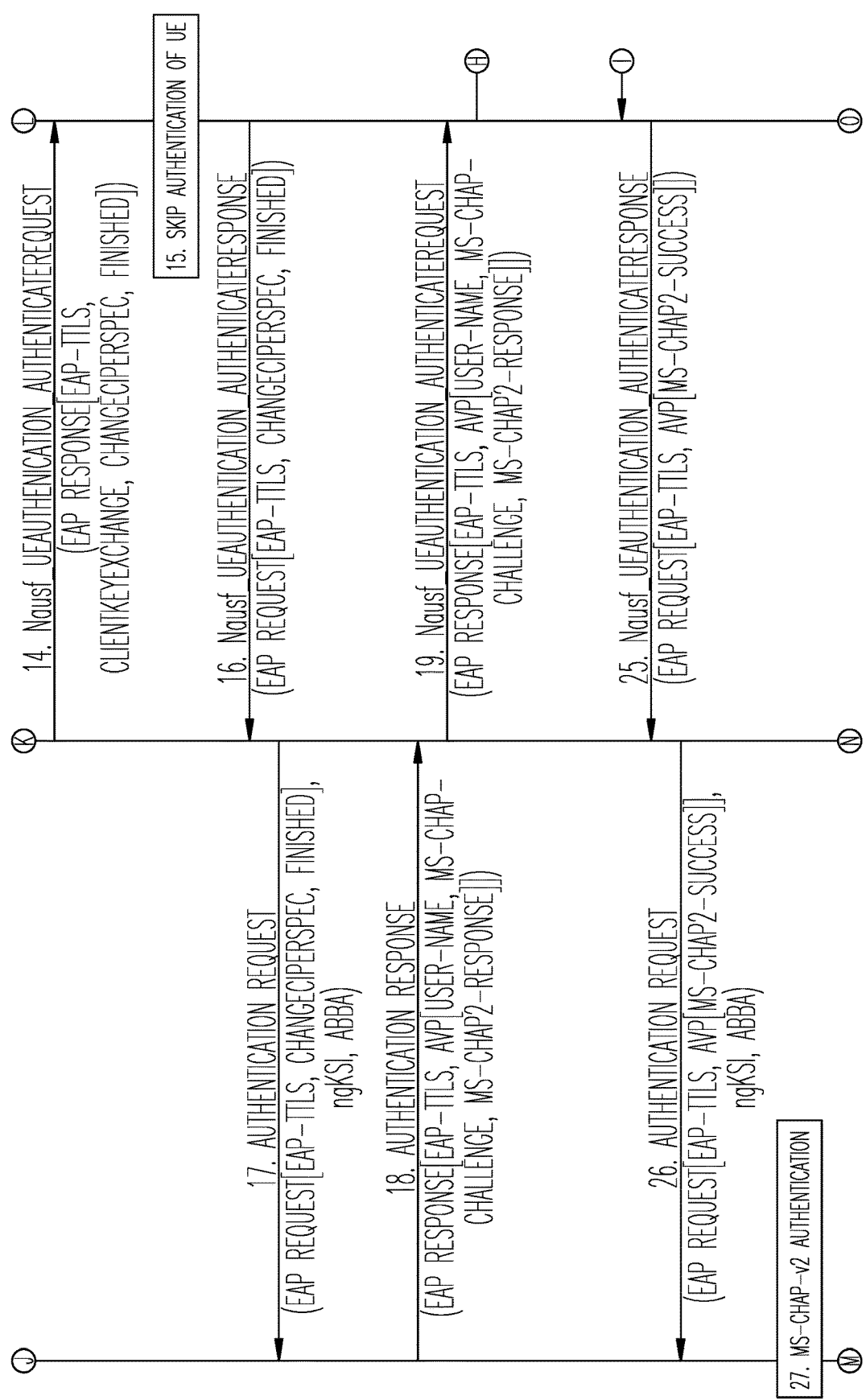
Figure 15E:
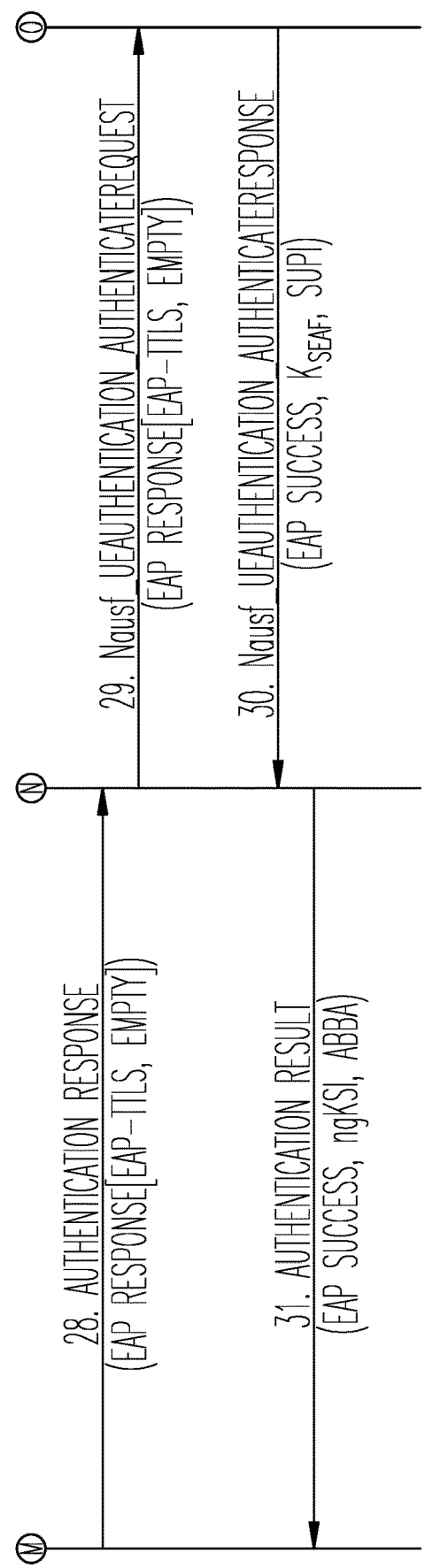

FIG. 14 illustrates key derivation in accordance with some aspects. When running primary authentication towards an external Credentials holder using AAA server for authentication as specified in clause I.2.2.z the derivation of $K_{AUSF}$ is based on the EAP-method credentials in the UE and AAA-S and shall be done as shown in FIG. 14. $K_{AUSF}$ shall be derived by the AUSF and UE from the MSK derived during the EAP authentication as specified in clause I.2.2.z.1.

I.2.a Credentials Holder Using AUSF and UDM for Primary Authentication

The 5G System architecture for SNPN with Credentials Holder using AUSF and UDM for primary authentication and authorization is described in clause 5.30.2.9.3 of TS 23.501.

I.x.1 Credentials Holder Using AUSF and UDM for Primary Authentication

For SNPNs with Credentials Holder using AUSF and UDM for primary authentication, service authorization as specified in clause 13.4.1.2 applies.

I.a SEPP and Interconnect Related Security Procedures

I.a.1 Credentials Holder Using AUSF and UDM for Primary Authentication

For SNPNs with Credentials Holder using AUSF and UDM for primary authentication, clause 5.30.2.9.3 of TS 23.501 states that the UE is not considered to be roaming, however SNPN and Credentials Holder communicate via SEPPs.

The following requirements and procedures related to SEPPs and interconnect security apply for SNPNs with Credentials Holder using AUSF and UDM for primary authentication: Requirements for Security Edge Protection Proxy (SEPP), clause 5.9.3.2; Protection between SEPPs, clause 13.1.2.

I.Y Securing Initial Access for UE Onboarding in SNPNs

I.Y.1 General

Onboarding of UEs for SNPNs is specified in clause 5.30.2.10 of TS 23.501. Onboarding of UEs for SNPNs allows the UE to access an Onboarding Network (ONN) based on Default UE credentials for the purpose of provisioning the UE with SNPN credentials and any other necessary information. The Default UE credentials are pre-configured on the UE. To provision SNPN credentials in a UE that is configured with Default UE credentials, the UE selects an SNPN as ONN and establishes a secure connection (or initial access) with that SNPN referred to as Onboarding SNPN (ON-SNPN). The present clause specifies securing of the initial access for UE onboarding.

I.Y.2 Authentication

I.Y.2.1 Requirements

The primary authentication shall be performed before initial access for UE onboarding is allowed. The UE shall use Default UE credentials for the primary authentication. Credentials or means used to authenticate the UE based on Default UE credentials may be stored within the ON-SNPN or in a Default Credentials Server (DCS) that is external to the ON-SNPN.

I.Y.2.2 Primary Authentication without Using DCS

When the primary authentication is performed between the UE and the ON-SNPN, any one of the existing authentication methods defined in the present document may be used, i.e., 5G AKA, EAP-AKA' or any other key-generating EAP authentication method (e.g., EAP-TLS). The choice of primary authentication method used is left to the decision of the ON-SNPN.

I.Y.2.3 Primary Authentication Using DCS

When the primary authentication is performed between the UE and the DCS, the authentication requirements and procedures defined in clause 1.2 for Credential Holder shall apply with the DCS taking the role of the Credentials Holder. When the DCS uses AAA Server for primary authentication, AUSF directly selects the NSSAAF as specified in 23.50. In this case, the UDM is not involved in the procedure defined in clause I.2.2.z.2, and the step 3 to step 5 shall be skipped.

The choice of primary authentication method used between the UE and the DCS is left to the decision of the DCS.

When the primary authentication is performed between the UE and the DCS via the AUSF using EAP-TTLS, Annex X can be used.

I.Y.2.4 Secondary Authentication Using DCS

When the DCS is not involved during primary authentication, after successful primary authentication as described in I.Y.2.2, upon the establishment of the Onboarding PDU Session, the ON-SNPN may trigger secondary authentication procedure with the DCS using Default UE credentials as described in clause 11.1.

The UE shall use Default UE credentials for the primary authentication. The secondary authentication is performed between the UE and the DCS. The secondary authentication may use the same Default UE credentials or a different UE credentials.

Primary Authentication Using EAP-TTLS in SNPNs

X.1 Introduction

In SNPN, when a credential holder is located outside of the 5GC of the SNPN, EAP-TTLS can be used to authenticate the UE. EAP-TTLS consists of two phases of authentication. In the first phase, a TLS tunnel is established between the UE and the EAP-TTLS server on AUSF. In the second phase, a legacy authentication protocol can be run between the UE and the credential holder (namely AAA) through the established TLS tunnel.

After the successful completion of EAP-TTLS, the AUSF and the UE derive the $K_{AUSF}$ from the EMSK. UE is provisioned with a trust anchor to enable verification of the EAP-TTLS server certificate. The provisioning of trust anchor on the UE is outside the scope of this document.

X.2 Procedure

FIGS. 15A-15E illustrates primary authentication in accordance with some aspects.

0. The UE is configured with the trust anchor needed to authenticate the certificate of the EAP-TTLS server running on the AUSF. Further, the UE is configured with the credentials required to authenticate with the AAA server.

Steps 1-17 are same as the steps 1-17 in clause B.2.2.1 in Annex B, except in the following steps:

1. The SUPI in the NAI format, i.e., username@realm, is used.

5. EAP-TTLS is selected by the UDM as the authentication method.

6-17. EAP-TTLS phase 1 is executed between the AUSF and the UE. EAP-Type is set to EAP-TTLS and the authentication of the UE using TLS client certificate is skipped. Since TLS client certificate is not used in EAP-TTLS, the UE need not be configured with UE certificate.

18-27. After EAP-TTLS phase 1 is successfully completed, the UE runs EAP-TTLS phase 2 authentication with the AAA as specified in RFC 5281 via NSSAAF. The phase 2 authentication method used is outside the scope of the present document but MS-CHAPv2 is depicted here as an example to show that the Nnssaaf_AIW_Authentication service offered by NSSAAF carries AVPs if the phase 2 authentication method is non-EAP.

As referenced in section 14.1.11 of RFC 5281, allowing the use of phase 2 (inner) authentication method outside of tunneled protocol leads to Man-in-the-Middle (MitM) vulnerability. Thus, it is assumed that the UE does not allow the use of phase 2 authentication method outside of TLS tunnel (i.e., the UE does not respond to requests for phase 2 authentication outside of the TLS tunnel). In environments where the use of phase 2 authentication outside of the tunneled protocol cannot be prevented, EAP-TTLS implementations need to address this vulnerability by using EAP channel binding or cryptographic binding described in RFC 6678.

28-31. After EAP-TTLS phase 2 authentication is successfully completed, the rest of the procedures are same as steps 18-21 described in clause B.2.1.1, except that the EAP-Type is set to EAP-TTLS in the EAP Response message from the UE to the AUSF.

B.2 Primary Authentication and Key Agreement

B.2.1 EAP TLS

B.2.1.1 Security Procedures

EAP-TLS is a mutual authentication EAP method that can be used by the EAP peer and the EAP server to authenticate each other. It is specified in RFC 5216 and draft-ietf-emu-eap-tls13. The 3GPP TLS protocol profile related to supported TLS versions and supported TLS cipher suites in 3GPP networks is specified in clause 6.2 of TS 33.210. The 3GPP profile of TLS certificates is specified in clause 6.1.3a of TS 33.310.

EAP-TLS supports several TLS versions, and the negotiation of the TLS version is part of EAP-TLS. The main principle of negotiation goes as follows. The EAP server indicates the support for EAP-TLS in the EAP-Request. If the peer chooses EAP-TLS, it responds with an EAP-Response indicating in the ClientHello message which TLS versions the peer supports. The EAP server chooses the TLS version, and indicates the chosen version in the ServerHello message.

The TLS procedure described in the RFC 5216 is applicable to TLS 1.2 defined in RFC 5246. The TLS procedure described in the draft-ietf-emu-eap-tls13 is applicable to TLS 1.3 defined in RFC 8446.

Figure 16A:
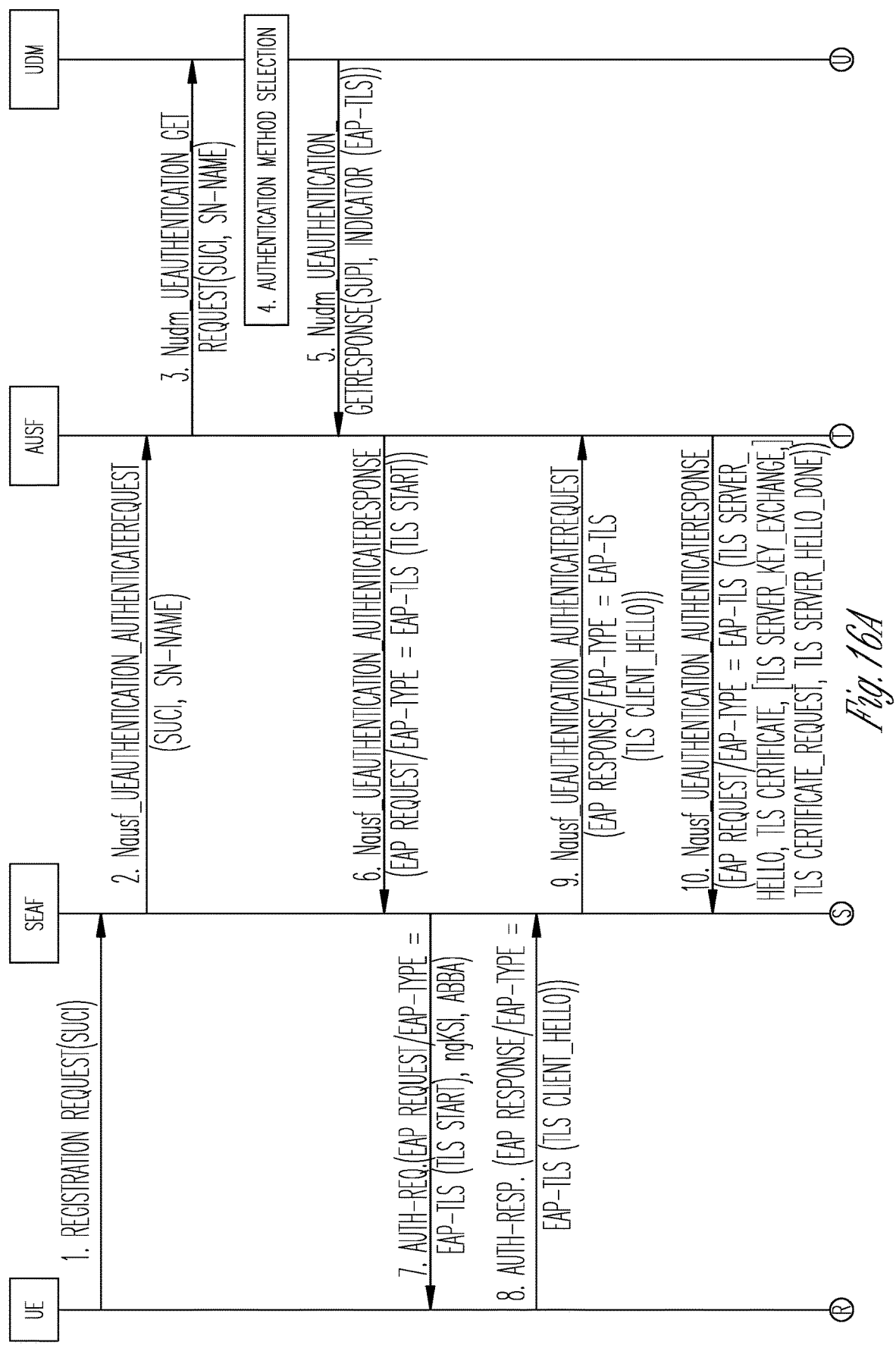
FIGS. 16A-16C illustrates Extensible Authentication Protocol—Transport Layer Security (EAP-TLS) Authentication Procedures over 5G Networks for initial authentication in accordance with some aspects.
Figure 16B:
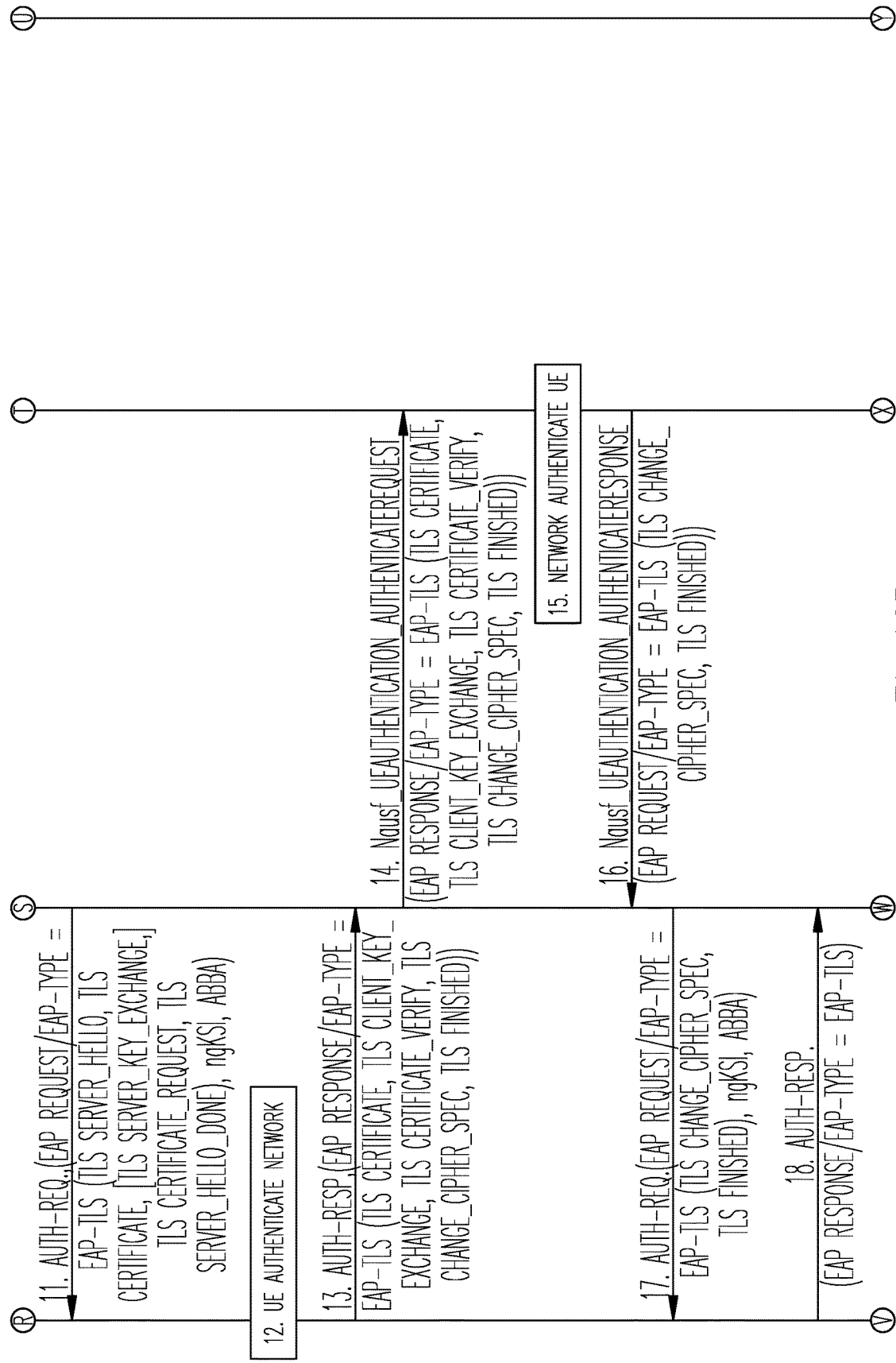
Figure 16C:
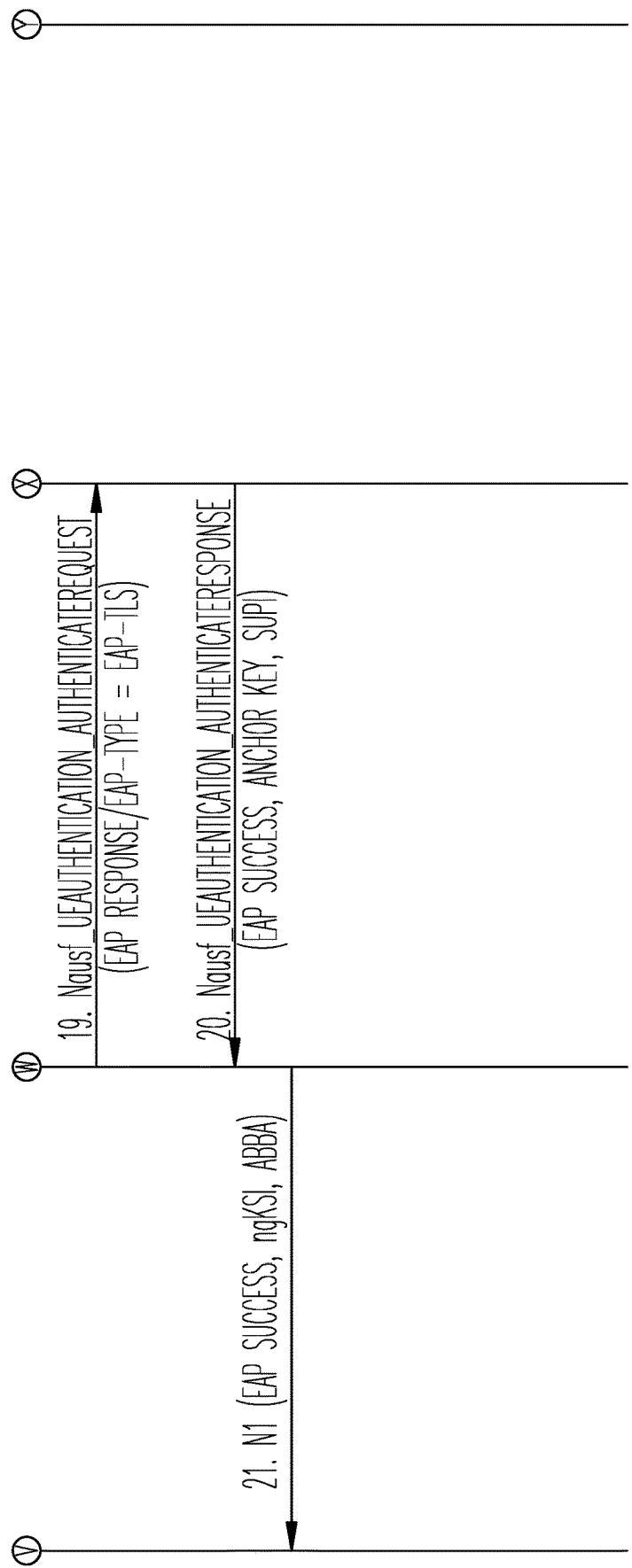
Figure 17A:
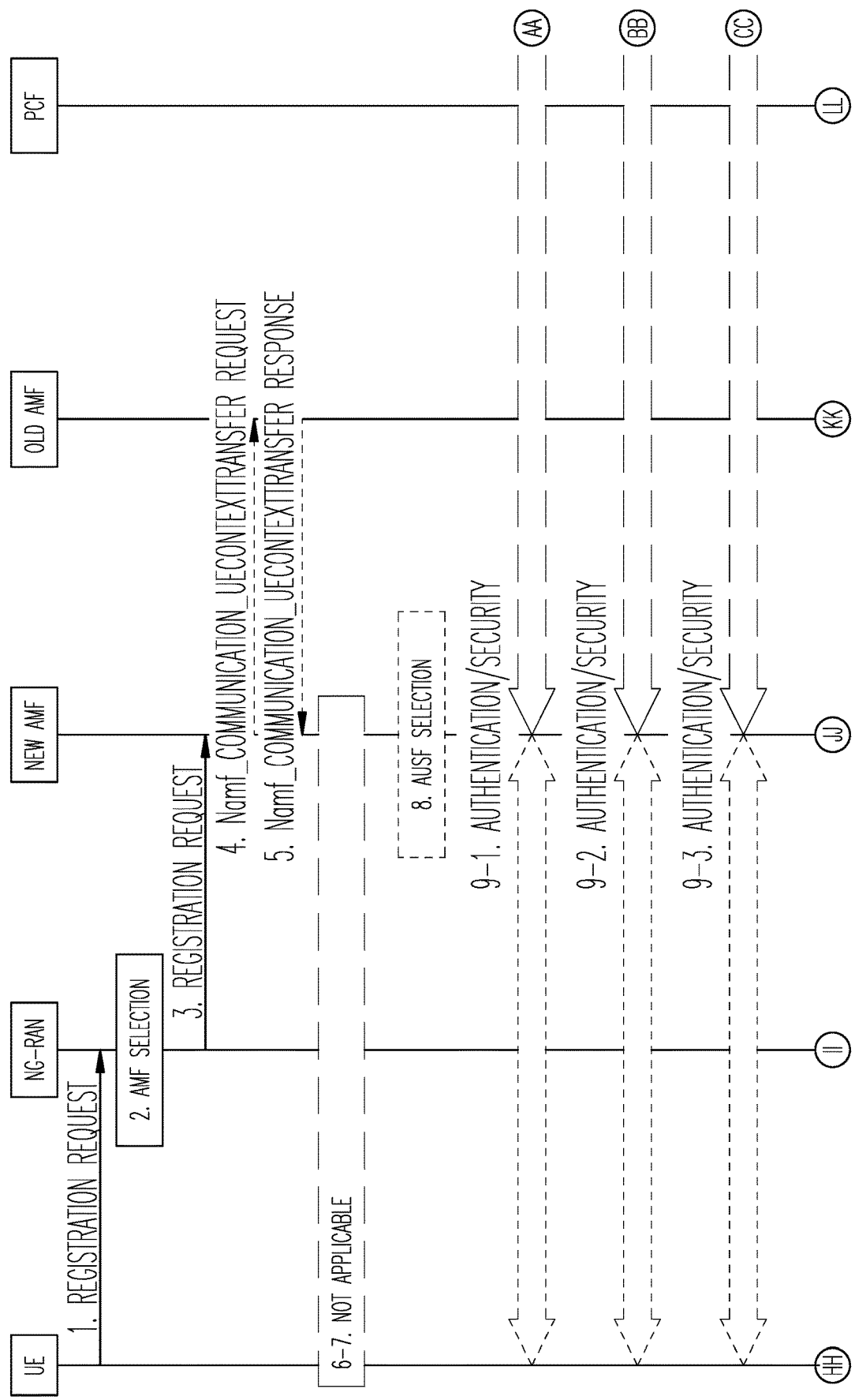
FIGS. 17A-17D illustrates UE Registration with ON-SNPN in accordance with some aspects.
Figure 17B:
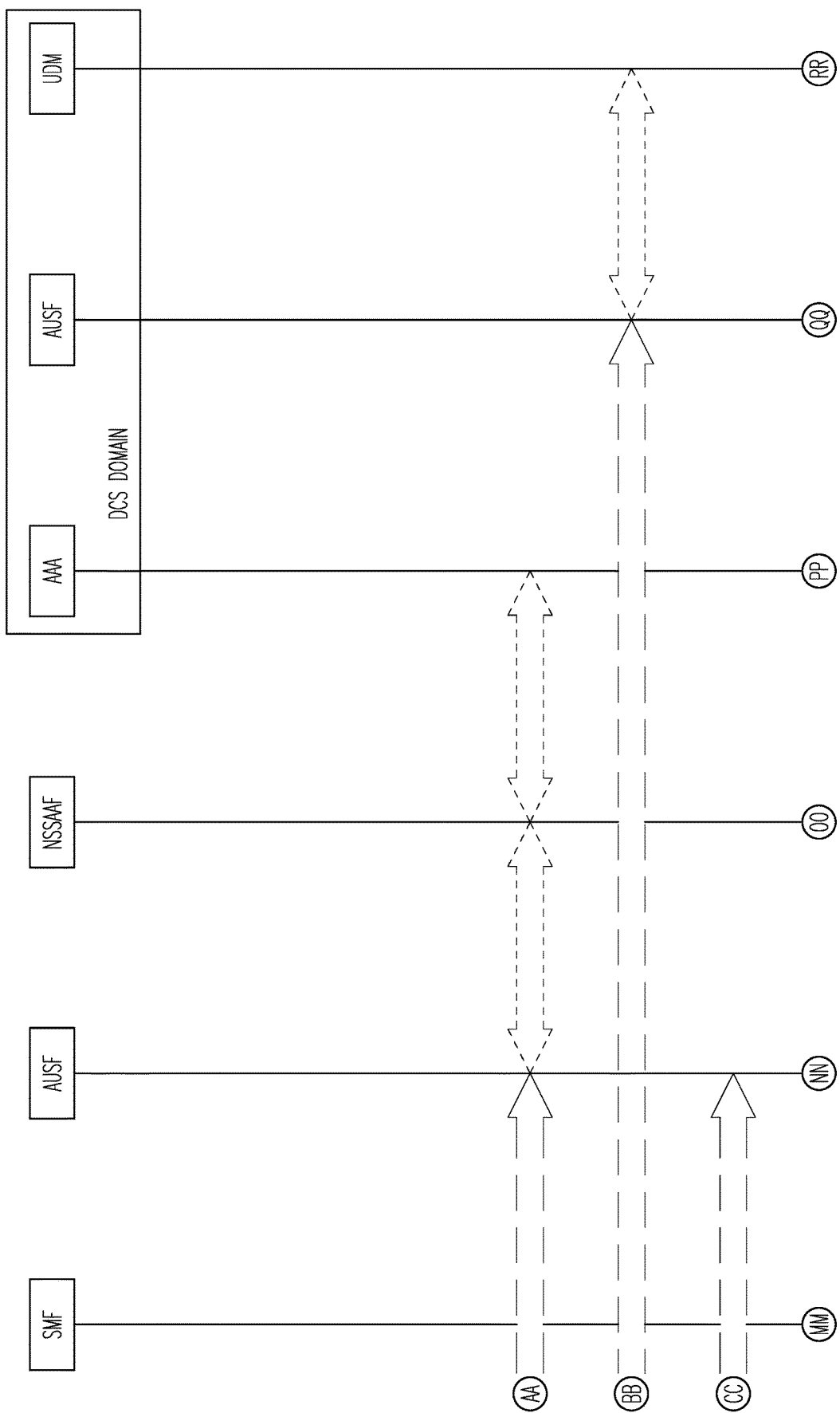
Figure 17C:
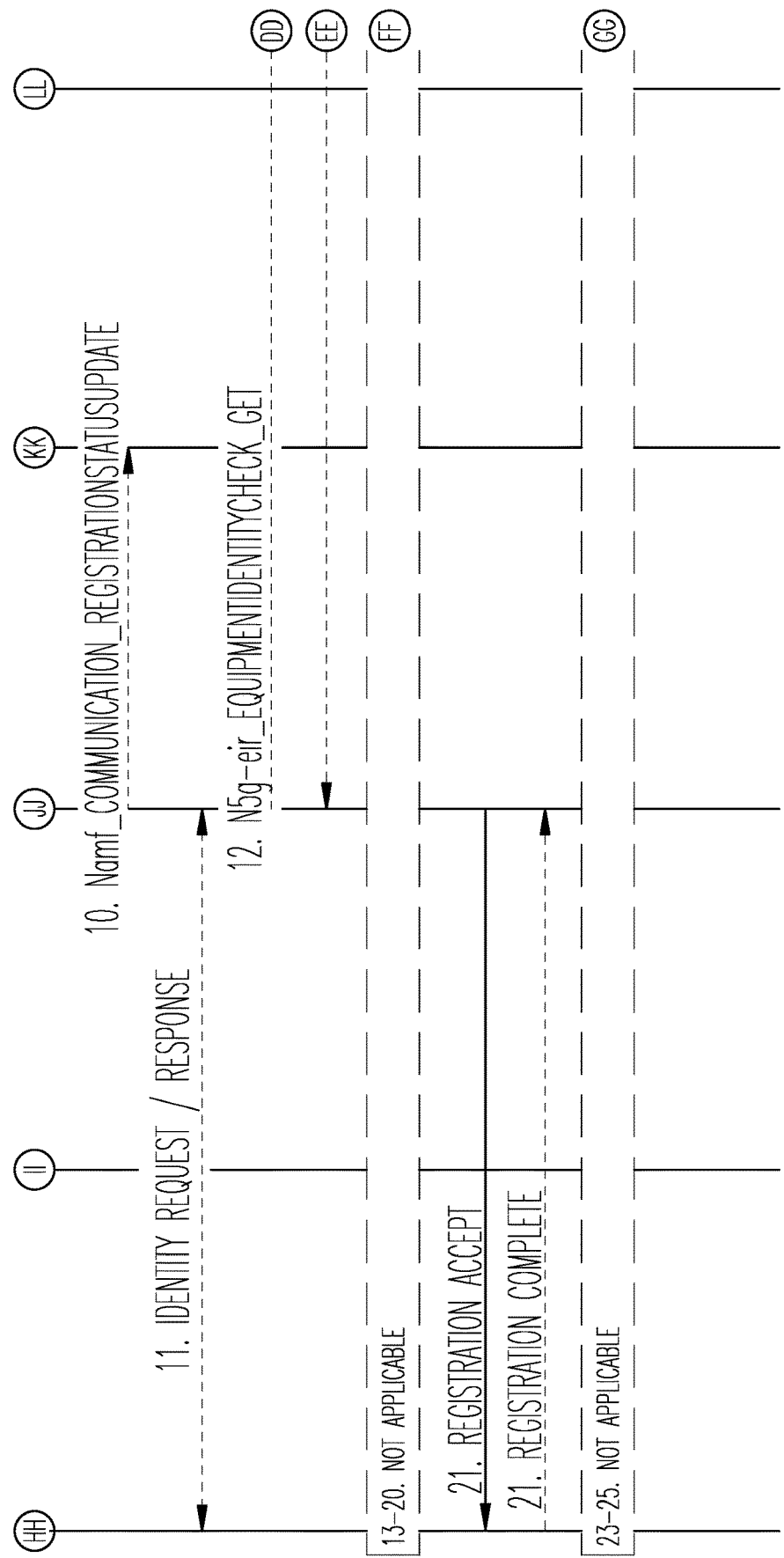
Figure 17D:
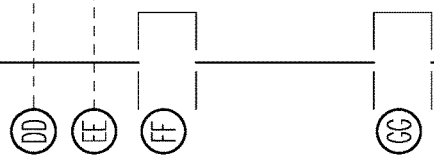

FIGS. 16A-16C illustrates EAP-TLS Authentication Procedures over 5G Networks for initial authentication in accordance with some aspects. The procedure below is based on the unified authentication framework from the present document, procedures from TS 23.502 and RFC 5216. The procedure for EAP-TLS with TLS 1.2 is presented here as an example, and other potential procedures are possible, e.g., if TLS resumption is used.

1. The UE sends the Registration Request message to the SEAF, containing SUCI. If the SUPI is in NAI format, only the username part of the NAI is encrypted using the selected protection scheme and included in the SUCI, together with the realm part in the NAI needed for UDM routing. Privacy considerations are described in Clause B.2.2.

2. The SEAF sends Nausf_UEAuthentication_Authenticate Request message to the AUSF. The SUCI and the serving network name (as described in clause 6.1.1.4) are included in the message.

3. AUSF sends the Nudm_UEAuthentication_Get Request, containing SUCI and the serving network name, to UDM. The general rules for UDM selection apply.

4. The SIDF located within the UDM de-conceals the SUCI to SUPI if SUCI is received in the message. The UDM then selects the primary authentication method.

5. If the UDM chooses to use EAP-TLS, it sends the SUPI and an indicator to choose EAP-TLS to AUSF in the Nudm_UEAuthentication_Get Response.

6. With the received SUPI and the indicator, the AUSF chooses EAP-TLS as the authentication method. The AUSF sends the Nausf_UEAuthentication_Authenticate Response message containing EAP-Request/EAP-TLS [TLS start] message to the SEAF.

7. The SEAF forwards the EAP-Request/EAP-TLS [TLS start] in the Authentication Request message to the UE. This message also includes the ngKSI and the ABBA parameter. In fact, the SEAF shall always include the ngKSI and ABBA parameter in all EAP-Authentication request message. ngKSI will be used by the UE and AMF to identify the partial native security context that is created if the authentication is successful. The SEAF shall set the ABBA parameter as defined in Annex A.7.1. During an EAP authentication, the value of the ngKSI and the ABBA parameter sent by the SEAF to the UE shall not be changed.

8. After receiving the EAP-TLS [TLS-start] message from SEAF, the UE replies with an EAP-Response/EAP-TLS [client_hello] to the SEAF in the Authentication Response message. The contents of TLS client_hello are defined in the TLS specification of the TLS version in use.

The EAP framework supports negotiation of EAP methods. If the UE does not support EAP-TLS, it should follow the rule described in RFC 3748 to negotiate another EAP method. In 5G system, UDM typically knows which EAP method and credentials are supported by the subscriber, and consequently EAP based negotiation may never be used.

9. The SEAF forwards the EAP-Response/EAP-TLS [client hello] message to AUSF in the Nausf_UEAuthentication_Authenticate Request.

10. The AUSF replies to the SEAF with EAP-Request/ EAP-TLS in the Nausf_UEAuthentication_Authenticate Response, which further includes information elements such as server_hello, server_certificate, server_key_exchange, certificate_request, server_hello_done. These information elements are defined in the RFCs for the corresponding TLS version in use.

11. The SEAF forwards the EAP-Request/EAP-TLS message with server_hello and other information elements to the UE through Authentication Request message. This message also includes the ngKSI and the ABBA parameter. The SEAF shall set the ABBA parameter as defined in Annex A.7.1. The message may not contain the TLS certificate_request parameter for one way authentication.

12. The UE authenticates the server with the received message from step 11. The UE is pre-configured with a certificate that can be used to verify server certificates. In some embodiments, the UE may be pre-configured with a UE (client) certificate.

13. If the TLS server authentication is successful, then the UE replies with EAP-Response/EAP-TLS in Authentication Response message, which further contains information element such as client_certificate, client_key_exchange, client_certificate_verify, change_cipher_spec, client_finished etc. The client_certficate is not sent for one way authentication if in step 10, the TLS certificate_request is not present. Privacy considerations are described in Clause B.2.1.2. When the Auth-Req message does not contain the TLS certificate_request parameter, the Auth-Resp message may not contain the TLS certificate or the TLS certificate_verify parameters. Thus, the TLS certificate of the client may not be included for one way authentication.

14. The SEAF forwards the message with EAP-Response/ EAP-TLS message with client_certificate and other information elements to the AUSF in the Nausf_UEAuthentication_Authenticate Request.

15. The AUSF authenticates the UE based on the message received. The AUSF verifies that the client certificate provided by the UE belongs to the subscriber identified by the SUPI. If there is a miss-match in the subscriber identifiers in the SUPI, the AUSF does not accept the client certificate. If the AUSF has successfully verified this message, the AUSF continues to step 16, otherwise it returns an EAP-failure.

The AUSF is required to be pre-configured with the root or any intermediary CA certificates that can be used to verify UE certificates. Deployment of certificate revocation lists (CRLs) and online certificate status protocol (OCSP) are described in clause B.2.2.

16. The AUSF sends EAP-Request/EAP-TLS message with change_cipher_spec and server_finished to the SEAF in the Nausf_UEAuthentication_Authenticate Response.

17. The SEAF forwards EAP-Request/EAP-TLS message from step 16 to the UE with Authentication Request message. This message also includes the ngKSI and the ABBA parameter. The SEAF shall set the ABBA parameter as defined in Annex A.7.1.

18. The UE sends an empty EAP-TLS message to the SEAF in Authentication Response message.

19. The SEAF further forwards the EAP-Response/EAP-TLS message to the AUSF in the Nausf_UEAuthentication_Authenticate Request.

20. The AUSF uses the most significant 256 bits of EMSK as the $K_{AUSF}$ and then calculates $K_{SEAF}$ from $K_{AUSF}$ as described in Annex A.6. The AUSF sends an EAP-Success message to the SEAF together with the SUPI and the derived anchor key in the Nausf_UEAuthentication_Authenticate Response.

21. The SEAF forwards the EAP-Success message to the UE and the authentication procedure is finished. This message also includes the ngKSI and the ABBA parameter. The SEAF shall set the ABBA parameter as defined in Annex A.7.1. Then the SEAF derives the $K_{AMF}$ from the $K_{SEAF}$, the ABBA parameter and the SUPI according to Annex A.7, and provides the ngKSI and the $K_{AMF}$ to the AMF.

On receiving the EAP-Success message, the UE derives EMSK and uses the most significant 256 bits of the EMSK as the $K_{AUSF}$ and then calculates $K_{SEAF}$ in the same way as the AUSF. The UE derives the $K_{AMF}$ from the $K_{SEAF}$, the ABBA parameter and the SUPI according to Annex A.7. Step 21 could be NAS Security Mode Command or Authentication Result.

As an implementation option, the UE creates the temporary security context as described in step 21 after receiving the EAP message that allows EMSK to be calculated. The UE turns this temporary security context into a partial security context when it receives the EAP Success. The UE removes the temporary security context if the EAP authentication fails.

B.2.1.2 Privacy Considerations

B.2.1.2.1 EAP TLS without Subscription Identifier Privacy

For EAP TLS, if the operator determines to not provide subscription identifier privacy for the UE in TLS layer (e.g., in TLS 1.2 without privacy option), the subscription identifier protection in NAS layer, i.e., in Step 1 of Figure B.2.1-1, becomes ineffective privacy-wise. Therefore, the operator may just choose that UE uses "null-scheme" for calculation of SUCI which is sent in NAS layer. However, the operator may anyway use other than null-schemes (e.g., one of ECIES schemes) for simplification of having single scheme for all UEs in NAS layer even though privacy is not enhanced in this particular case.

The operator could also determine not to provide subscription identifier privacy for the UE in NAS layer even though the TLS layer inherently provides subscription identifier privacy (e.g., in TLS 1.3). In such case, the operator may just choose that UE uses "null-scheme" for calculation of SUCI which is sent in NAS layer.

B.2.1.2.2 EAP TLS with Subscription Identifier Privacy

For EAP TLS, if the operator determines to provide subscription identifier privacy for the UE in TLS layer, the EAP TLS server needs to support privacy either inherently (e.g., in TLS 1.3) or via separate privacy option (e.g., in TLS 1.2). If privacy is an option in TLS layer, then the operator needs to configure UE with the information that privacy-on-TLS layer is enabled. Further, following considerations need to be taken.

In Step 1 of Figure B.2.1-1, it is important that calculation of SUCI, which is sent in NAS layer, is done using schemes other than "null-scheme". Otherwise, the subscription identifier protection provided by TLS layer becomes ineffective privacy-wise. Nevertheless, the "null-scheme" could be used in NAS layer while still preserving subscription identifier privacy, by omitting the username part from NAI as described in RFC 4282 clause 2.3 [y]. It would be analogous to using anonymous identifier in EAP, meaning that only realm part from NAI is included in SUCI which is sent in NAS layer. Thus formed SUCI can still be used to route the authentication request to AUSF.

In Step 13 and 14 of Figure B.2.1-1, when TLS 1.2 is used, the UE would need to behave as described in "Section 2.1.4. Privacy" of RFC 5216 [38] where instead of sending the client certificate in cleartext over the air, the UE first sends TLS certificate (no cert) and only later sends TLS certificate after a TLS is setup.

FIGS. 17A-17D illustrates UE Registration with ON-SNPN in accordance with some aspects.

Registration with Onboarding SNPN

This clause specifies how a UE can register to an ON-SNPN for provisioning the UE with SO-SNPN credentials and other information to enable SNPN access as defined in clause 5.30.2.10 of TS 23.501.

The Registration procedure for onboarding SNPN shall be supported as specified in clause 4.2.2.2.2 with the following changes compared to the steps in the call flow represented in FIGS. 17A-17D, covering two cases i.e., when the DCS hosts the AAA server and when DCS hosts the AUSF/UDM as shown in FIGS. 17A-17D.

1. UE to NG-RAN: AN parameters shall include Onboarding indication if the UE is accessing 5GS for Onboarding. The registration type "SNPN Onboarding" indicates that the UE wants to perform SNPN Onboarding Registration (i.e., allows the UE to access an ON-SNPN for the purpose of provisioning the UE with SO-SNPN credentials). For SNPN Onboarding Registration, a SUCI generated from a SUPI derived from Default UE Credentials shall be included as described in clause 5.30.2.10.2.6 of TS 23.501.

If the UE has registered in the ON-SNPN for onboarding, it can perform a Mobility Registration Update, or a Periodic Registration Update as specified in clause 4.2.2.2.2. If the onboarding registered UE wants to perform a Mobility Registration Update the AN parameters shall also include an Onboarding indication that the UE is registered for onboarding. When the UE is performing Registration for Onboarding to an ON-SNPN, the UE does not include a Requested NSSAI as the UE is not pre-configured with a S-NSSAI for the purpose of UE onboarding in the ON-SNPN.

2. Based on the Onboarding indication in step 1, the NG-RAN selects an AMF as described in clause 6.3.5 of TS 23.501.

3. NG-RAN to AMF: The N2 message contains the Registration Request as described in step 1.

4. [Conditional] new AMF to old AMF: Namf_Communication_UEContextTransfer (complete Registration Request).

5. [Conditional] old AMF to new AMF: Response to Namf_Communication_UEContextTransfer (SUPI, UE Context in AMF (as per Table 5.2.2.2.2-1)). Once the registration is completed successfully, the new AMF may start the implementation specific timer for when to deregister the onboarding registered UE if the UE context contains the indication that the UE is registered for onboarding.

6-7. Skipped.

8. When the AMF receives a NAS Registration Request with the 5GS Registration Type set to "SNPN Onboarding", the AMF applies locally configured AMF Configuration Data for Onboarding in order to restrict UE network usage to only onboarding and stores in the UE Context in the AMF an indication that the UE is registered for onboarding. The AMF selects an AUSF as described in clause 5.30.2.10.2.6 of TS 23.501. Based on ON-SNPN policies, the AMF may start an implementation specific deregistration timer configured for UE Onboarding as described in TS 23.501.

9. The authentication is performed as described in TS 33.501. For a DCS hosting the AAA server as shown in step 9-1, based on local configuration (e.g., using the realm part of the Onboarding SUCI), the AUSF sends the Onboarding SUCI and Default UE credentials received from the UE towards the DCS via the NSSAAF, which authenticates the UE based on received data from the AUSF. During the authentication procedure, the DCS may provide the PVS FQDN or PVS IP address for the UE to the AUSF. The AUSF provides PVS FQDN or PVS IP address to the AMF.

For a DCS hosting the AUSF/UDM as shown in step 9-2, the AUSF in the DCS domain performs UDM selection. The AMF sends the Onboarding SUCI and Default UE credentials received from the UE towards the AUSF in the DCS domain, which authenticates the UE based on received data from the AMF. During the authentication procedure, the DCS may provide the PVS FQDN or PVS IP address for the UE to the AUSF. The AUSF provides PVS FQDN or PVS IP address to the AMF.

When the DCS is not involved during primary authentication as shown in step 9-3, the AMF selects a local AUSF as defined in TS 23.501 clause 6.3.4 and performs primary authentication towards the local AUSF using the UE default credentials as described in TS 33.501.

10. [Conditional] new AMF to old AMF: Namf_Communication_RegistrationStatusUpdate.

11. [Conditional] AMF to UE: Identity Request/Response (PEI). If the PEI was not provided by the UE, the Identity Request procedure is initiated by the AMF sending an Identity Request message to the UE to retrieve the PEI.

12. Optionally the new AMF initiates an ME identity check by invoking the N5g-eir_EquipmentIdentity-Check_Get service operation (see clause 5.2.4.2.2). The PEI check is performed as described in clause 4.7.

13-20. Skipped.

21. AMF to UE: The AMF sends a Registration Accept message to the UE indicating that the Registration Request for the Onboarding SNPN has been accepted. The Allowed NSSAI containing the S-NSSAI from the AMF Onboarding Configuration Data is included in the N2 message to the NG-RAN.

21b. Skipped.

22. UE to AMF: The UE sends a Registration Complete message to the AMF.

23-25. Skipped.

Thus, a UE with only manufacturer credentials establishes a connection with an Onboarding Server to provision the UE with network credentials. The network credentials can be 3GPP credentials, example, SUPI and associated key for AKA or non-3GPP credentials, example user identifier in NAI format and associated digital certificate. An NG-RAN in the SNPN is configured to broadcast system information about the support for a restricted onboarding service. The UE indicates that the connection is for the restricted onboarding service in the RRC Establishment procedure that enables the NG-RAN to select an appropriate AMF in the SNPN. The AMF selects a designated SMF, which in turn selects a designated PSA that provides a restricted data connection to the Onboarding Server. The Onboarding Server then validates the authenticity of the UE based on the manufacturer credentials. The Onboarding Server, in agreement with the future Home Network of the UE, configures the UE with network credentials that will allow the UE to register with an NPN while being authenticated by the HN. The network credentials are generated by the Onboarding Server and then pushed to the Home Network. The UE, based on the network credentials, initiates a registration procedure with the HN. The UE thus authenticates the network using one way authentication as part of primary authentication procedure and performs mutual authentication with DCS using any EAP method as part of secondary authentication.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

The subject matter may be referred to herein, individually and/or collectively, by the term "embodiment" merely for convenience and without intending to voluntarily limit the scope of this application to any single inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, UE, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus for a user equipment (UE), the apparatus comprising:
    processing circuitry configured to, during initial access to an onboarding Stand-alone Non-Public Network (O-SNPN) via an access and mobility function (AMF):
    select the O-SNPN;
        determine whether subscriber identifier privacy is to be used during onboarding with the O-SNPN;
        in response to a determination that subscriber identifier privacy is to be used during the onboarding with the O-SNPN, set a UE identity to an anonymous value;
        encode, for transmission to the O-SNPN after selection of the O-SNPN, a registration request that includes an indication of registration of the UE for onboarding and UE information that includes a default UE credential;
        decode, from the O-SNPN, an O-SNPN certificate in response to the registration request; and
        authenticate the O-SNPN using one way authentication based on the O-SNPN certificate, the UE provisioned with a set of roots of trust certificate information to authenticate the O-SNPN using the O-SNPN certificate; and
    a memory configured to store the UE information.

2. The apparatus of claim 1, wherein the registration request includes the UE identity encoded in a Subscription Permanent Identifier (SUPI) format.

3. The apparatus of claim 2, wherein the SUPI format is a Network Access Identifier (NAI) in a form of "username@realm".

4. The apparatus of claim 1, wherein the processing circuitry is configured to encode, for transmission to the O-SNPN, at least one of an application identifier or a Service Provider Identifier.

5. The apparatus of claim 1, wherein the processing circuitry is configured to perform, with the O-SNPN, primary authentication using non-Authentication and Key Agreement (AKA) communications.

6. The apparatus of claim 5, wherein the non-AKA communications comprise an Extensible Authentication Protocol-Transport Layer Security (EAP-TLS).

7. The apparatus of claim 1, wherein the processing circuitry is configured to automatically discover and select the O-SNPN based on information in a system information broadcast (SIB) from the O-SNPN.

8. The apparatus of claim 1, wherein the processing circuitry is configured to present, via a user interface, available onboarding networks for manual selection of the O-SNPN.

9. The apparatus of claim 1, wherein the processing circuitry is configured to use a set of roots of trust certificate information stored in the memory to authenticate the O-SNPN during primary authentication.

10. The apparatus of claim 1, wherein the processing circuitry is configured to:
perform primary authentication of the O-SNPN using the one way authentication; and
perform secondary authentication after the primary authentication, the secondary authentication including mutual authentication with a Default Credential Server (DCS) using Extensible Authentication Protocol (EAP) communications.

11. The apparatus of claim 10, wherein the processing circuitry is configured to obtain network credentials after the primary authentication, the network credentials comprising a Subscription Permanent Identifier (SUPI) and an associated key for Authentication and Key Agreement (AKA) communications.

12. The apparatus of claim 10, wherein the processing circuitry is configured to obtain network credentials after the primary authentication, the network credentials comprising a Network Access Identifier (NAI) and associated digital certificate.

13. The apparatus of claim 1, wherein the registration request indicates a connection request for a restricted onboarding service in a radio resource control (RRC) Establishment procedure that enables selection of an appropriate AMF in the O-SNPN.

14. The apparatus of claim 1, wherein the processing circuitry is configured to, after validation by an onboarding server of authenticity of the UE based on manufacturer credentials stored in the memory:
decode network credentials that allow the UE to register with a non-public network (NPN) while being authenticated by a home network (HN) of the UE, and initiate registration with the HN based on the network credentials.

15. An apparatus for an access and mobility function (AMF) of an onboarding Stand-alone Non-Public Network (O-SNPN), the apparatus comprising:
processing circuitry configured to:
encode, for transmission, a system information broadcast indicating support for a restricted onboarding service, the support for the restricted onboarding service indicating subscriber privacy is to be used;
decode, from a user equipment (UE), a registration request that includes an indication of registration of the UE for onboarding using the restricted onboarding service and manufacturer UE credentials, a UE identity in the registration request being anonymous;
encode, for transmission to the UE, an initial authentication request that contains an O-SNPN certificate for one way authentication by the UE based on the O-SNPN certificate; and
decode, from the UE, an initial authentication response to the O-SNPN certificate; and
a memory configured to store the O-SNPN certificate.

16. The apparatus of claim 15, wherein the processing circuitry is configured to encode, for transmission to the UE, network credentials comprising one of:
a Subscription Permanent Identifier (SUPI) and an associated key for Authentication and Key Agreement (AKA) communications, or
a Network Access Identifier (NAI) and an associated digital certificate.

17. A non-transitory computer-readable storage medium that stores instructions for execution by one or more processors of a user equipment (UE), the one or more processors to configure the UE to, when the instructions are executed:
decode a system information broadcast from an onboarding Stand-alone Non-Public Network (O-SNPN), the system information broadcast indicating support for a restricted onboarding service;
select the O-SNPN;
determine, based on the system information broadcast whether subscriber identifier privacy is to be used during onboarding with the O-SNPN;
in response to a determination that subscriber identifier privacy is to be used during the onboarding with the O-SNPN, set a UE identity to be anonymous in UE information;
encode, for transmission to the O-SNPN after selection of the O-SNPN, a registration request that includes an indication of registration of the UE for onboarding and the UE information that includes manufacturer UE credentials;
decode, from the O-SNPN, an O-SNPN certificate in response to the registration request; and
authenticate the O-SNPN using one way authentication based on the O-SNPN certificate, the UE provisioned with a set of roots of trust certificate information to authenticate the O-SNPN using the O-SNPN certificate.

* * * * *